United States Patent

Brittan et al.

(10) Patent No.: US 6,199,078 B1
(45) Date of Patent: Mar. 6, 2001

(54) ANALYTIC NETWORK ENGINE AND SPREADSHEET INTERFACE SYSTEM

(75) Inventors: Philip Brittan, Brooklyn, NY (US); Frank Leon Rose, Mt. Dora, FL (US); Mat Baskin, Bronx; Louis Franco, Brooklyn, both of NY (US)

(73) Assignee: Sphere Software Engineering, Inc., New York, NY (US)

( * ) Notice: Subject to any disclaimer, the term of this patent is extended or adjusted under 35 U.S.C. 154(b) by 0 days.

(21) Appl. No.: 09/153,114

(22) Filed: Sep. 15, 1998

(51) Int. Cl.[7] .................................................. G06F 15/00
(52) U.S. Cl. ............................................................ 707/503
(58) Field of Search ..................................... 707/503, 500, 707/504, 515, 526, 530, 538; 345/326, 333, 55, 352, 332

(56) References Cited

U.S. PATENT DOCUMENTS 5,276,607 * 1/1994 Harris et al. ........................ 364/401
5,717,939 * 2/1998 Bricklin et al. ..................... 707/503
5,742,835 * 4/1998 Kaether ............................... 707/503
5,768,158 * 6/1998 Adler et al. ......................... 364/578
5,970,506 * 10/1999 Kiyan et al. ........................ 707/503

* cited by examiner

Primary Examiner—Joseph H. Feild
Assistant Examiner—Alford W. Kindred
(74) Attorney, Agent, or Firm—Brown Raysman Millstein Felder & Steiner LLP

(57) ABSTRACT

A method and system for calculating values for fields interrelated by circular formulas in a data network is described. The system contains a first calculator for which a first field serves as an input value and a second field serves as an output and a second calculator for which the second field serves as an input value and the first field serves as an output. A conflict checker determines whether a circular conflict exists after input of the input value into the first field or the second field, and a conflict resolver resolves the conflict by suppressing the input value in the first field or second field upon determination of the circular conflict.

38 Claims, 22 Drawing Sheets

ANALYTIC NETWORK ENGINE AND SPREADSHEET INTERFACE SYSTEM

COPYRIGHT NOTICE

A portion of the disclosure of this patent document contains material which is subject to copyright protection. The copyright owner has no objection to the facsimile reproduction by anyone of the patent document or of the patent disclosure as it appears in the Patent and Trademark Office patent files or records, but otherwise reserves all copyright rights whatsoever.

BACKGROUND OF THE INVENTION

The present invention relates to a data processing system and method for providing a data network with the ability to perform circular calculations. More particularly, the present invention relates to an analytic engine having a network of integrated calculator relationships which may be used as a simulator or scenario building system.

Prior to the advent of computerized data processing systems, solving matrices describing large, complex systems was a difficult, time consuming task. Completing a large matrix frequently requires hundreds of individual calculations. Some relief came in the mid 1970's when desktop and hand held electronic calculators, such as the UNICOM 102 by Rockwell and the HP-29C by Hewlett Packard, became widely available. Some calculators, such as the HP 9810A by Hewlett Packard, were developed as programmable calculators with limited memory. With these calculators, commonly used formulas for a matrix could be input into the calculator and stored in order to speed calculation of the matrix.

As personal computers became available, the potential use in calculating matrices using an electronic spreadsheet program was seen quickly. An electronic spreadsheet has the elements of a matrix, plus the ability to automatically calculate the relationships between data fields to produce output. An electronic spreadsheet has columns and rows, with individual intersections representing fields or cells in the spreadsheet. As with a matrix, values can be input into the individual fields of the spreadsheet. Output fields are created by inputting a formula into each output field. The inputs for entered formulas can be either input data fields or outputs from other formulas. When an error is found, the error can be corrected by editing the formula for an output field without having to recalculate the formulas dependent on that field.

Heretofore, users could not provide circular formulas to a spreadsheet. There are times when it is desirable to provide for such circular formulas. For example, a user may want to perform scenarios on a spreadsheet. With some spreadsheet applications, such as EXCEL™ from Microsoft, the only way this could be done was to successively try different combinations of input values until the desired output value is found. Some spreadsheet programs do provide solver functions wherein a dialog box appears allowing a user to enter a result for the formula to solve for. The spreadsheet's solver then attempts to guess the input values. However, the user must choose which input fields can be changed and only the formula for the output field the user is trying to solve for could be used. Using the solver is cumbersome due to the need to fill in a dialog box each time the function is to be used. Further, users are forced to designate fields as either input or output, each type having different characteristics.

Another limitation on data networks and spreadsheets heretofore has been that they do not have the ability to have more one than formula associated with an output field. It may be desirable to associate an output field with more than one formula so that different scenarios can be performed and different output can be displayed.

Moreover, a specific limitation to spreadsheets heretofore has been that they do not provide the ability to hide calculation layers from users so that a spreadsheet-based application can be published to users who can only type in values and get back answers without ever seeing, or being able to change the calculations that drive that application.

In business, engineering, scientific or personal finance applications, the ability to perform what-if scenarios is crucial. Although attempts have been made to provide a user with the ability to perform what-if scenarios, they have been substantially limited by algorithms which only provide the ability to guess at inputs successively until the desired output is reached. Problem or spreadsheet solvers have only allowed users to give a single output value and choose fields in the data network which can be changed, and are generally cumbersome to use because the user must perform those choices through a series of programming commands, menus or dialog boxes. Finally, solvers heretofore did not provide the ability to allow use of different formulas for calculating the inputs for a desired output in what-if scenarios than was used for calculating the output.

There is thus a need for a data network system which provides homogenous fields that do not need designation as input or output fields so that, among other things, what-if scenarios can be easily performed. There is further a need for fields in a data network which allow entry of multiple circular formulas for various what-if scenarios.

BRIEF SUMMARY OF THE INVENTION

It is an object of the present invention to solve the problems described above with existing spreadsheet programs.

It is another object of the present invention to provide a powerful and efficient scenario building tool.

It is another object of the present invention to allow for scenario building while resolving conflicts arising from circular relationships.

These and other objects of the invention are provided by a method and system for calculating values for fields inter-related by circular formulas in a data network The system contains a first calculator for which a first field serves as an input value and a second field serves as an output and a second calculator for which the second field serves as an input value and the first field serves as an output. A conflict checker determines whether a circular conflict exists after input of the input value into the first field or the second field, and a conflict resolver resolves the conflict by suppressing the input value in the first field or second field upon determination of the circular conflict.

Some of the objects of the invention are also achieved by programming methods and processing systems for use in connection with a spreadsheet application program having a plurality of fields capable of storing a plurality of values. The methods and systems may be implemented in whole or in part by computer programs stored on a computer readable medium such as a floppy or hard disk or optical medium such as a CD-ROM or DVD and executable on a computer. The programs may also be stored on a server computer and may be downloaded to client computers via a network such as the Internet.

One such method comprises storing a first formula which receives as input a value from each of one or more first fields in the spreadsheet program and produces an output value to be presented in a second field in the spreadsheet program, and storing a second formula which receives as input a value from each of one or more third fields in the spreadsheet program and produces an output to be presented in the second field. Thus, two formulas produce output for the same spreadsheet field, a condition which is typically disallowed by and causes an error message with conventional spreadsheet programs. In the method of the present invention, however, when input values are available in the one or more first fields or one or more third fields, one of the first formula and second formula is selected, and the selected formula is used to produce an output value for the second field.

When input values are available in the first fields only, the first formula is selected. As described herein, different logic may be employed by the computer program implementing the method in selecting one of the formulas when input values are available in both the one or more first fields and the one or more third fields. For example, when the input values in the first fields and third fields become available at different times, and one of the formulas is selected based on the time at which the input values become available. The first formula is selected when the first fields have values which become available later than the values in the one or more third fields. Other logic is employed to select formulas, including allowing users to set priorities for the formulas for use in resolving conflicts between formulas, and comparing and selected based on types of formulas.

In particular embodiments, a third formula may be input which receives as input a value from the second field and produces an output value to be presented in one of the one or more third fields. The second field is thus acting as both input field for the third formula and output for the first and second formulas. When the first formula is selected and used to produce an output in the second field, the third formula is used to produce the output value in the third field. Alternatively, a user may be allowed to input a constant value into the second field, and the third formula is again used to produce an output value in the third field. If the user deletes the constant value from the second field, one of the first and second formulas is selected and used to produce an output value for the second field. If values are input into the first or third fields after the constant value is input, the constant value is stored in memory and the second field is set based on the first or second formulas. If those input values are removed, the stored constant value is retrieved and again used to set the second field, which in turn sets the third field using the third formula.

Another method involves storing a first formula which receives as input a value from each of one or more first fields in the spreadsheet program and produces an output value to be presented in a second field in the spreadsheet program and allowing a user to input a constant value in the second field. The second field is here again used as both input and output field. When values are available in the first fields, the first formula is used to produce an output value for the second field, and either the output value or constant value is selected for setting the second field. The constant value may be a default constant value for the second field which is used to set the second field when a value is not otherwise available in one of the first fields or if the user does not input a new constant into the second field.

In particular embodiments of this method the constant value is selected when the constant value is input by the user after values become available in the first fields and the output value is selected when the values become available in the first fields after the constant value is input by the user. The constant value input by the user in the second field is stored when the output value is displayed in the second field, and the constant value is retrieved for display in and setting of the second field when values become unavailable in the first fields.

Another method in accordance with the present invention for use in connection with a spreadsheet application program involves allowing a first user having a first user identifier to input a plurality of formulas for receiving input values from one or more first fields in the spreadsheet and producing output values in one or more second fields in the spreadsheet, and storing the formulas in association with the first user identifier. A second user is allowed to input values in the first fields to thereby invoke the formulas to produce output values, but is prevented from modifying the formulas. The second user may also be allowed to input second formulas for receiving input values from first fields in the spreadsheet and producing output values in one or more second fields in the spreadsheet. These second formulas are stored in addition to the first formulas and may take precedence to the first formulas. This method may also be applied to constant values such as default values input by the first user.

BRIEF DESCRIPTION OF THE DRAWINGS

The invention is illustrated in the figures of the accompanying drawings which are meant to be exemplary and not limiting, in which like references refer to like corresponding parts, and in which:

FIGS. 4–17 are screen displays of an exemplary spreadsheet program having an add-on application program implementing the analytic network system of particular embodiments of the present invention;

DETAILED DESCRIPTION OF THE PREFERRED EMBODIMENTS

Preferred embodiments of the invention are now described with reference to the drawings.

Figure 1:
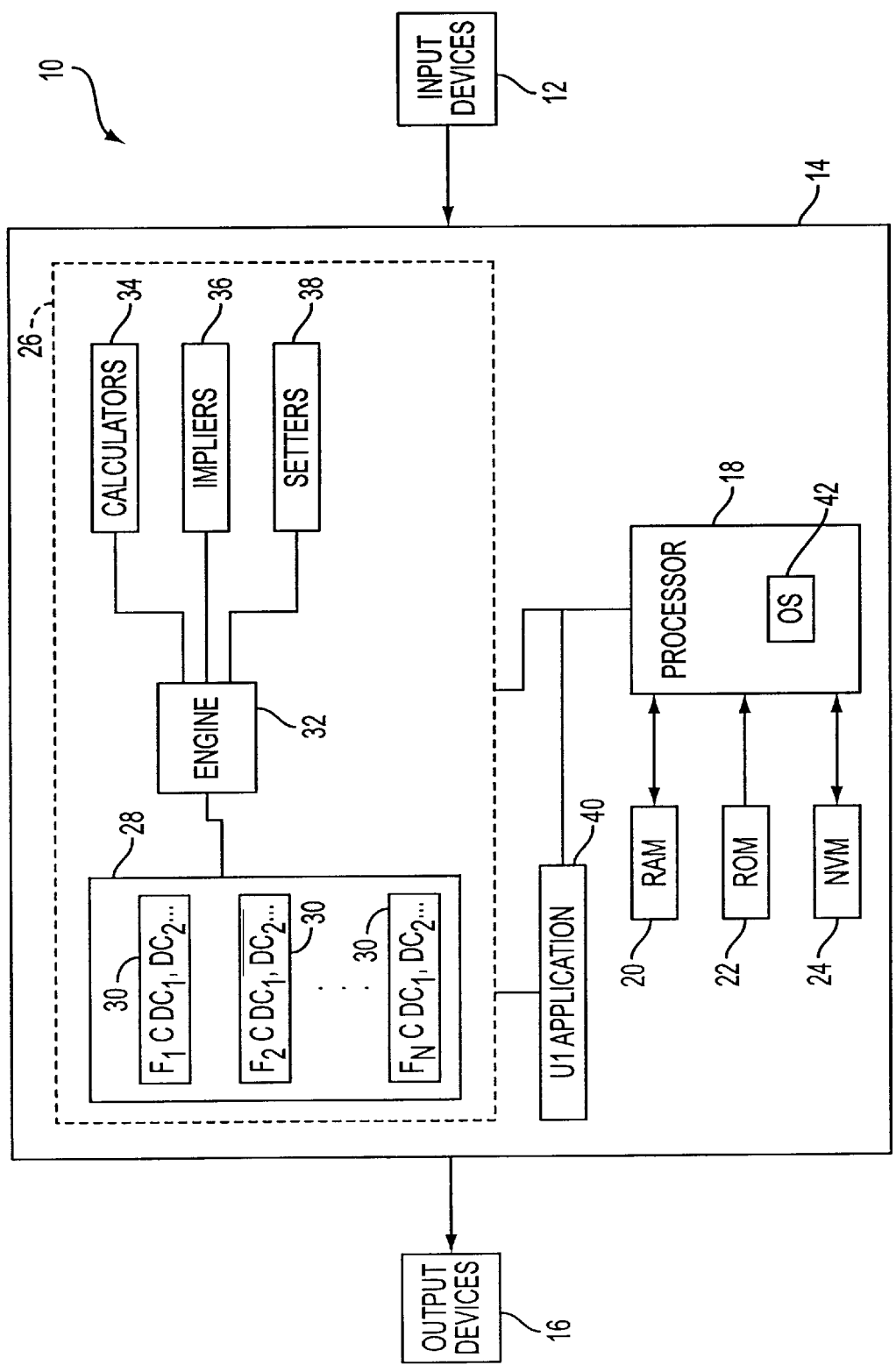
FIG. 1 is a block diagram of an analytic network system of one embodiment of the present invention.

As shown in FIG. 1, in accordance with the present invention an analytic network system 10 contains one or more input devices 12, such as a keyboard, mouse, electronic stylus, or other conventional input devices, a processing system 14, and one or more output devices 16 including a display, printer, or other conventional output device. The processing system 14, which may be a personal computer, networked client/server computer system, or other convention computer system, contains hardware and software elements. The hardware elements include a processor 18, such as a PENTIUM model processor available from Intel Corporation, and a number of memory devices including a RAM 20, ROM 22, and one or more non-volatile memory devices 24 such as a hard disk, floppy disk, optical disk, etc.

The software elements of the system 10 include an analytic network 26 which contains a number of software objects or routines. The analytic network 26 includes a collection 28 of fields 30, an analytic engine 32, and one or more calculators 34, impliers 36, and setters 38. The nature, function and operation of each of these elements is described in greater detail below. The analytic network 26 is linked to a user interface application program 40, which may be a spreadsheet application such as the EXCEL program as described further below, or may be any other user interface program capable of receiving input from a user for use by the analytic network 26 and presenting results to the user. The analytic network 26 and user interface application 40 are stored in the memory devices 20, 22, 24 and executed on the processor 18, upon which is executing an operating system 42 such as the WINDOWS operating system, as known to those of skill in the art.

The field collection 28 contains a number of fields 30 and relationships between fields and other elements of the analytic network 26. Each field represents a data value in the analytic network 26. Each field is further associated with a code C that represents the state of the value. In some embodiments, the code states are: Clear, for when the data in the field is invalid or unknown; Set, for when the data in the field was given by a constant setter, as described below; Calced, for when the data in the field was given by a calculator, as described below; and Default, for when the data in the field was given by a default setter. The field collection 28 adopts fields, calculators and setters and manages the interactions between them, as described further below.

The calculators 34 are stored formulas for calculating the value of a field from the values of other fields. Each calculator has a target field, or simply target, which is the field being calculated, and one or more operand fields which serve as the input to the calculator 34. One type of calculator 34, a code dependent calculator, calculates its target when all of the operands have codes that are non-Clear. An example of this type of calculator is a sum calculator that calculates the sum of its operands as soon as they are known. Another type of calculator is a dependent calculator, which is dependent on a field or fields in that the field or fields are operands of the calculator. Each field is associated with its dependent calculators DC for use in propagation, as described below. A particular type of dependent calculator, a value dependent calculator, is a calculator whose readiness is dependent not only on the codes of the operands, which must all be non-Clear, but also on their values.

A relationship is a group of calculators that are inversions of each other. The calculators in a relationship must have the same set of fields attached to them, with a different field in that set designated as the target.

The setters 38 represent seed values for the analytic network 26, upon which the calculators 34 act to propagate values throughout the fields in the network. A setter has a target field or target and a method for setting a value for the target field. A constant setter is not dependent on any fields in the network. A default setter calculates its value from other fields in the network. It is similar to a calculator, but differs in that it is not a forced relationship. The calculators and setters are input by users through the user interface application 40, and are stored in one of the memory devices.

The impliers 36 are routines that can determine the value of a field that would propagate a specific value to another field. The field that is known is called the source and the one that is being calculated is called the target. It is used when a relationship cannot be expressed with the target field as the result. It is also used to solve for the inverse of a calculator by guessing values for the input until the output matches the value input by the user. These impliers uses techniques commonly referred to as Newton's algorithm for finding roots, as known to those of skill in the art.

In accordance with the invention, and as described more below, the engine 32 propagates values throughout the fields in the network by using the dependent calculators on fields when they are set or changed. The engine performs consistency checking among the fields to resolve circular references and inconsistencies. When the target of a calculator is non-clear, a check is performed to see if its value is consistent with values generated by other calculators. Usually this check is the result of an equality comparison of the two values. Inconsistencies are thereafter solved by hierarchical rules. Towards this end, the engine 32 maintains a list of rollback list of calculators that have been called by propagating a particular setter through the network. If a target of a calculator already has a value then a consistency check is done. If the check fails, all of the calculators in the rollback list reset their target field to the state it had before it changed it.

Figure 2:
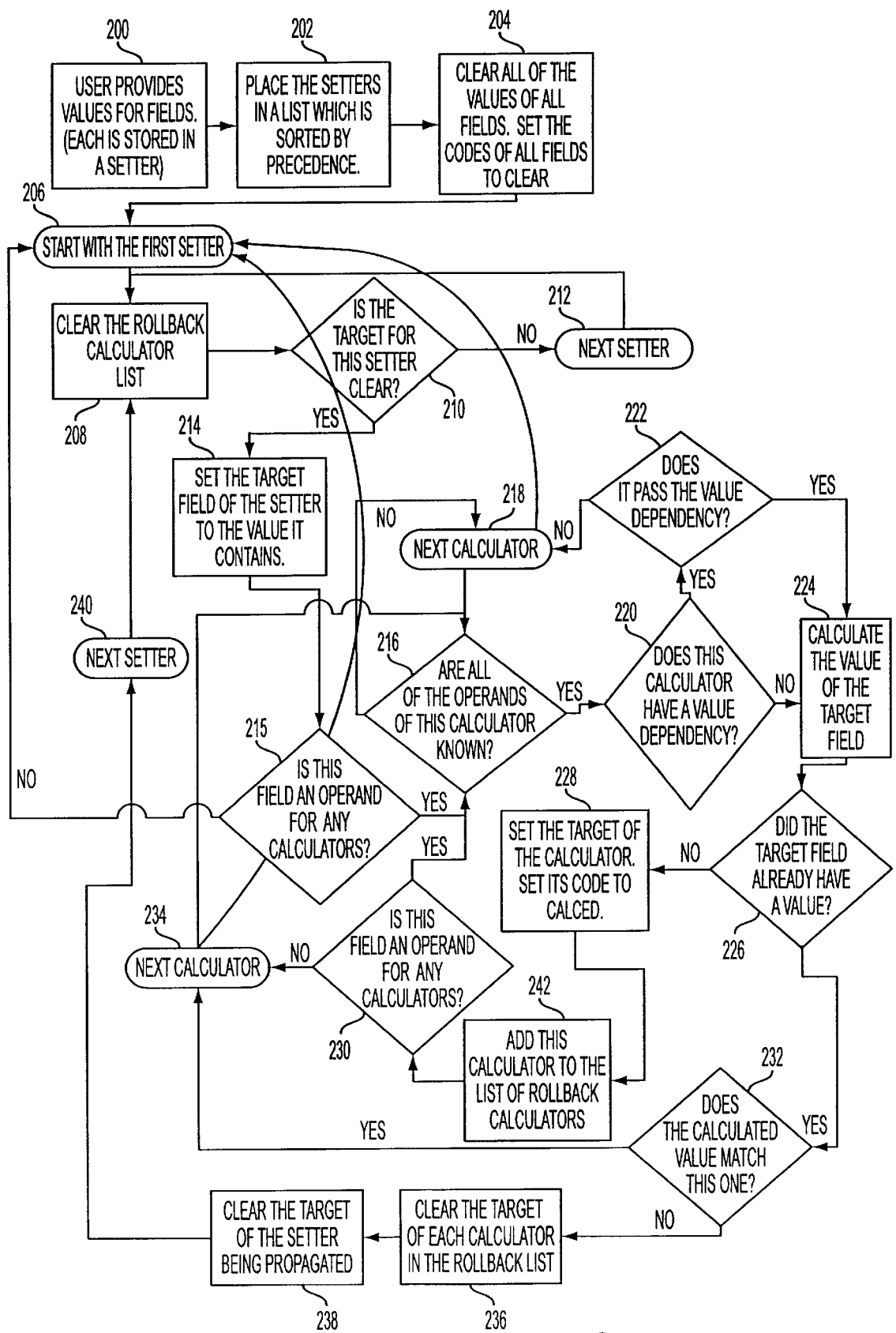
FIG. 2 is a flow chart showing the process of propagating values through the analytic network system of FIG. 1.

The flowchart in FIG. 2 illustrates in greater detail this process of propagation of setting values throughout an analytic network 26 of the present invention and the mechanism for resolving contradictory input values for the fields, or what is referred to as over-specification. The flowchart assumes that the network is already constructed as described above and values are being entered into the network.

First, the user provides values for a subset of the fields in the network, step 200. Setters are created that associate each of these values with their target fields. Each setter is put into a list, step 202, which is sorted by priority as explained in more detail below. Propagation then starts with clearing all of the data from the fields in the network, step 204. The codes for all of the fields are, at that point, set to Clear.

For each setter in the list, step 206, the following procedure is applied to the network. First, the list of rollback calculators are cleared 208. Then, the target for of the setter is checked to see if it is clear, step 210. If it is not clear, i.e. the field has a value, then the current setter isn't needed and processing moves to the next setter, step 212.

If the field is clear, i.e. the code of the field is Clear, then the target field of the current setter gets the value stored in the setter and its code is set to Set, step 214. If the field has no dependent calculators then processing moves back to the first setter to restart the iteration. This does not cause an infinite loop, because any fields that were set by step 214 are skipped because of step 210. The purpose re-processing the first setter is that some setters are based on the values of other fields. One of those setters may have been sorted before the current setters and failed, but would pass if was processed after the current setter. To avoid this order dependency, whenever a setter succeeds, processing of all the setters that have failed is retried since the failed setters have precedence over the rest of the list.

If the field has any dependent calculators, then each calculator is iterated. If all of the operands for a calculator do not have values then the next setter is processed, steps 216–218. If the operands for the calculator do have values, then the calculator is checked to see if it has a value dependency, i.e. the calculator's applicability is dependent on the values of its operands. If there is value dependency, then the calculator is checked to see if it is consistent with value dependency, steps 220, 222. If it is not consistent, then the next calculator is processed. When processing is done with the calculators, then the current setter has succeeded and processing moves back to step 206 to retry all of the setters that have failed.

If a calculator does not have a value dependency or if it does but passes the value dependency tests, then the calculator is used to calculate the value for the target field, step 224. If the target field has no value, then the result from the calculation becomes the target's value and the target's code is set to Calced, steps, 226–228. The current calculator gets added to the list of rollback calculators, which will be used to reverse a setter if the setter is found to be in conflict with the network. When the new value is set in the field, the field will be checked to see if it has any dependent calculators, step 230, for which processing will be moved back to step 216 to calculate the operands.

If the result of step 226 is that the target field already has a value, then the current calculator will be only used as a consistency check with that value. If the two values match, step 232, then the current setter is consistent with the network and processing can move to the next calculator, step 234. If the values do not match, then the setter that propagated to this point is not consistent with the network and will be ignored. The rollback list is consulted and the target is cleared of every calculator stored there, step 236. Also, the target of the setter must also be cleared, step 238, and processing moves to the next setter, step 240.

Figure 3:
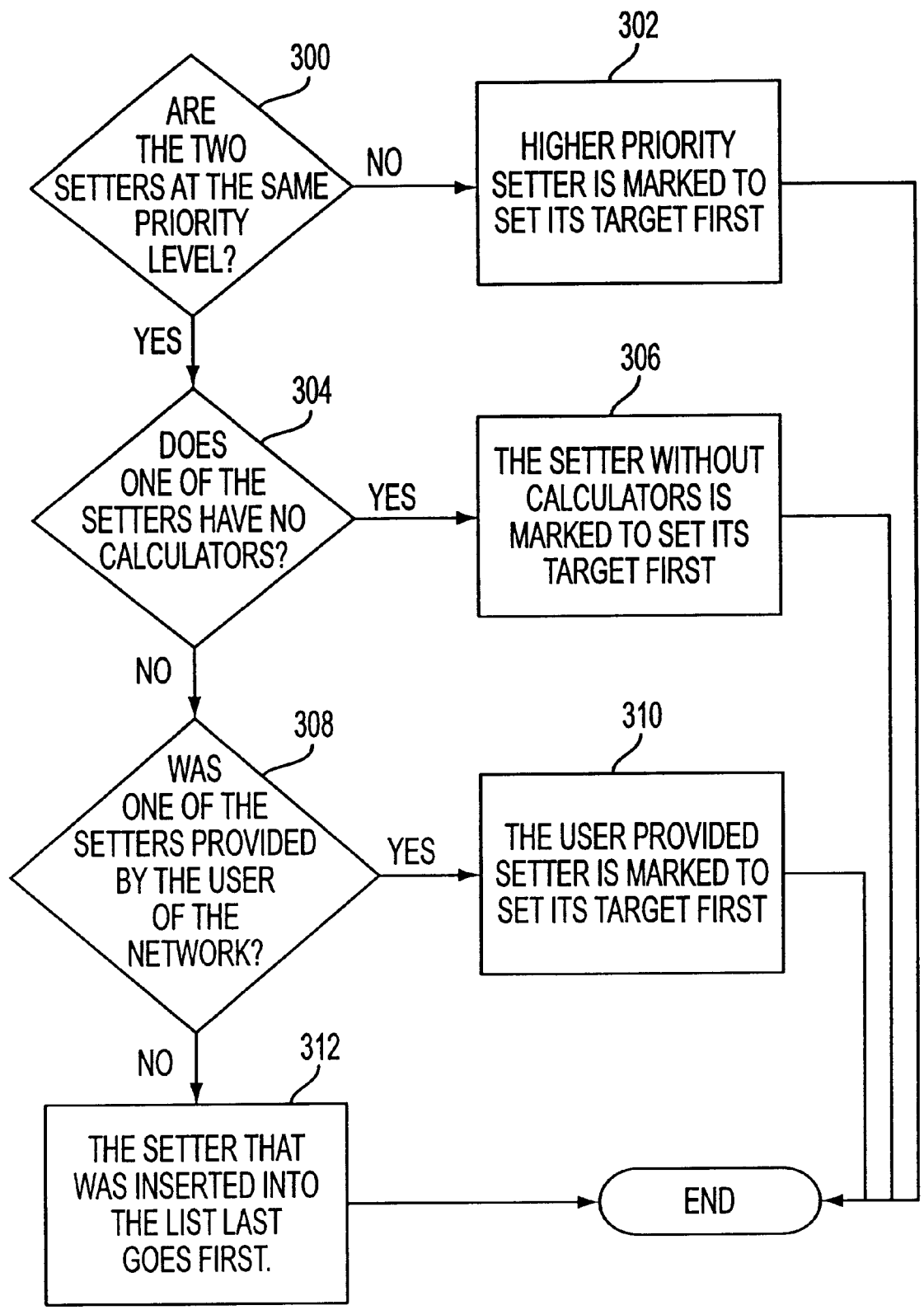
FIG. 3 is a flow chart showing the process of sorting setters during the propagation process shown in FIG. 2.

The process of determining priority between two setters is now described in greater detail with reference to FIG. 3. First, the two setters are compared to see if they have the same priority level, step 300. If they do not have the same priority level, then the higher priority setter would set the value for its target field before the lower priority setter, step 302. If the priorities are at the same level, the setters are checked to see if one of them has no calculators, step 304. If one of the setters does not have calculators then that setter would set its corresponding target field before the other setter, step 306. If both setters have calculators, then the setters are checked to see if a setter was user provided, step 308. If one of the setters was provided by the user, then the user provided setter would set the value for its corresponding target field first, step 310. If both of the setters were not user provided, then the setter that was inserted into the list last sets its target field value before the earlier setter, step 312. Once priority between two setters can be determined standard industry sorting techniques, such as quicksort, or heapsort can be applied to a list of setters to create a priority list.

The sorting of the setters is significant because if, for example, the setter for a first field has priority before the setter for a second field in the list then, a conflict between the setters for the first field and the second field is resolved by suppressing the setter for the second field and using the setter for the first field. The goal of the sort is to provide a heuristic for which setter is to be used in the event of a conflict As explained above, the analytic network 26 (FIG. 1) is operated with a user interface program 40. In particular embodiments, this program is a spreadsheet program such as EXCEL available from Microsoft Corporation or LOTUS 1-2-3 available from Lotus Development Corporation. The spreadsheet program is a matrix paradigm which allows users to enter values for some fields or cells and formulas for other cells.

With reference to screen displays in FIGS. 4–17, one preferred embodiment of the invention comprises a shell for EXCEL. The shell extends EXCEL through its add-in interface, as known to those of skill in the art. The system of the present invention can be incorporated into the spreadsheet program through use of the Microsoft Object Linking and Embedding (OLE) standard. The OLE environment as developed and defined by Microsoft Corporation is well known in the art and is described in many sources, including OLE 2 Programmer's Reference Vols. I and II, Microsoft Press 1993, and Brockschmidt, Inside OLE 2, Microsoft Press, Second Edition 1995, which are hereby incorporated herein by reference. The analytic network program 26 as implemented in preferred embodiments to integrate with EXCEL is referred to herein as the Modeler program or simply Modeler. Alternatively, the analytic network functionality described herein may be directly integrated with a spreadsheet application by adding or building in programming code to implement the functionality, as known to those of skill in the art.

Figure 4:
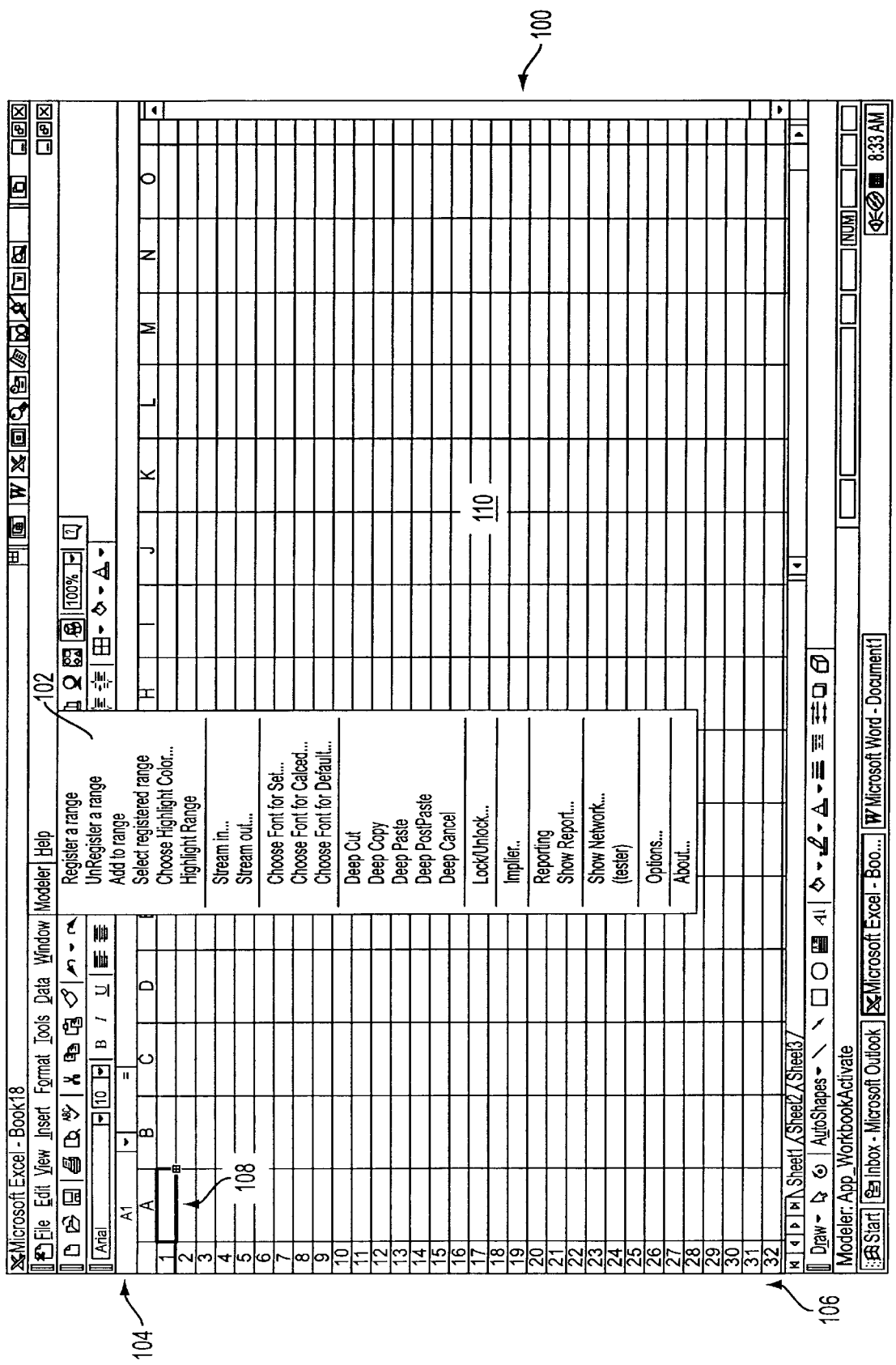

As shown in FIG. 4, a typical electronic spreadsheet screen display 100 provides lettered columns 104 and numbered rows 106 for entering data or formulas in specific cells or fields. Lettered columns 104 are labeled in succession as A, B, C, D, etc. and numbered rows 106 are labeled in succession as 1, 2, 3, 4, etc. A spreadsheet containing a plurality of fields, generally indicated at 110, is provided in an electronic spreadsheet in which each of the fields is identified by an intersection between a column letter and a row number. A field selector or highlight cell 108 is provided to indicate the current field for data entry. For example, in FIG. 4, the field currently selected by selector 108 can be identified with the intersection A1. Selector 108 can be moved from field to field within spreadsheet 110 with either the arrow keys on a keyboard or by a pointing device such as a mouse.

The following example demonstrates how a user can create and use a matrix representing an analytic network that converts between different temperature scales using the Modeler as an add-on to an electronic spreadsheet program. The Modeler provides an add-on menu 102 to the spreadsheet interface 100. Brief explanations of the selections in menu 102 are as follows:

Register a Range: Allows a user to select a range of fields to add to the data network of the Modeler. The group of selected fields are called a registered range, of which there could be several in a single spreadsheet.

UnRegister a Range: Allows a user to select fields to no longer exhibit the behavior set by the Modeler of the present invention.

Add to range allows the user to add selected fields to the registered ranges of a spreadsheet, and Select Registered Range causes a registered range to be selected so that the user can see the boundaries or perform global actions on those ranges.

Choose Highlight Color allows the user to select which color will be used as a highlight color, and Highlight Range causes the fields of the registered ranges in the current spreadsheet to have their background color set to the user-chosen highlight color.

Stream in: Causes the Modeler to read in a text-based file representation of a spreadsheet, and Stream out causes the Modeler to write out a text-based file representation of the current spreadsheet.

Modeler allows users to distinguish between values which are set or calculated. Choose Font for Set allows the user to specify which font (face, style, size, color, etc.) will be used for values which are set. Set values are entered directly by the user or from an external source into a field (i.e. the values are not calculated). Set value fields are automatically given this font by the Modeler as they are entered. Choose Font for Calced allows the user to specify which font will be used for values which are calculated. With respect to the Modeler, calculated values are the result of a calculator defined with a field as target, i.e., these values are not entered directly by the user or an external source. Calculated values in fields are automatically given this font by the Modeler as they are calculated. Choose Font for Default allows the user to specify which font will be used for values which are defaults. Default values are used by the Modeler when no set or calculated value is available for a particular field. Default values are defined by a literal value or a formula entered as a default setter into the Modeler.

Modeler also provides several editing functions which are specific to the representation of formulas in the spreadsheet cells as setters or calculators. Deep Cut behaves basically like a standard Cut command, but cuts not only the surface values but also associated objects, including calculators, defaults, and impliers specified for a field. The objects are put onto the Windows Clipboard when a Deep Cut command is issued. Deep Copy behaves basically like the standard Copy command, but it copies not only the surface values but also all the calculators, defaults, and impliers specified for a field. All of these are put onto the Windows Clipboard when a Deep Copy command is issued. Deep Paste behaves basically like a standard Paste command, but it pastes not only the surface values but also all the calculators, defaults, and impliers specified for a field. All of these are pasted from the Windows Clipboard into the currently selected field when a Deep Paste command is issued.

Deep PostPaste behaves basically like the Deep Paste command, but allows the user to reverse the Paste and the Copy or Cut steps. When a Deep Paste command is issued, the user has indicated to the system that he or she wishes to paste something, unspecified at this point, into the currently selected field. When the user next issues a Deep Cut or Deep Copy Command, all the values, calculators, defaults, and impliers that are put onto the Windows Clipboard are automatically pasted into the field where the user had previously issued the Deep PostPaste command and the cursor is returned to that latter field. If the user has issued a Deep PostPaste command, but does not want to complete the command, he or she can issue a Deep Cancel command. If the user subsequently issues a Deep Cut or Deep Copy command, the contents of the selected field will be placed on the Windows Clipboard, and not automatically pasted onto the field previously specified in the Deep PostPaste command.

Lock/Unlock allows the user to block access to, or lock, a currently unlocked Modeler spreadsheet or allow access, or unlock, a currently locked spreadsheet. To lock a spreadsheet means that users of the spreadsheet cannot access (view, copy, edit, or delete) the calculators, defaults, and impliers specified by the spreadsheet author, but they can enter values and the Modeler spreadsheet will perform calculations and work otherwise as it normally does. When a spreadsheet is locked, the author must supply a password. That password is required to unlock the spreadsheet. Unlocking the spreadsheet returns it to its original state, so that users can access all values, calculators, defaults, and impliers.

The Modeler program stores calculators and setters in its memory space. To lock the spreadsheet, the Modeler associates a user's identifier such as a password with the user's set of calculators, setters, and impliers, and requires input of the password before allowing editing of these objects. A second user may use the spreadsheet including these objects, but may not edit them without the password. The second user may create and add additional calculators, setters or impliers to a given spreadsheet application, and these would be stored by the Modeler and work in conjunction with the previously input, protected objects.

Implier allows the user to specify an implied value for a field. The Modeler stores the input impliers in its memory space.

Reporting turns on a mode where the Modeler tracks every internal event that occurs while the Modeler is in use. Show Report shows a list of every internal event recorded by the Modeler since the Reporting command was issued. Show Network shows a textual representation of the underlying analytic network created by the user in the Modeler. These functions are used for debugging purposes.

Options allows the user to specify personal preferences. About displays a dialog box indicating the author of the Modeler program and shows the version number.

Figure 5:
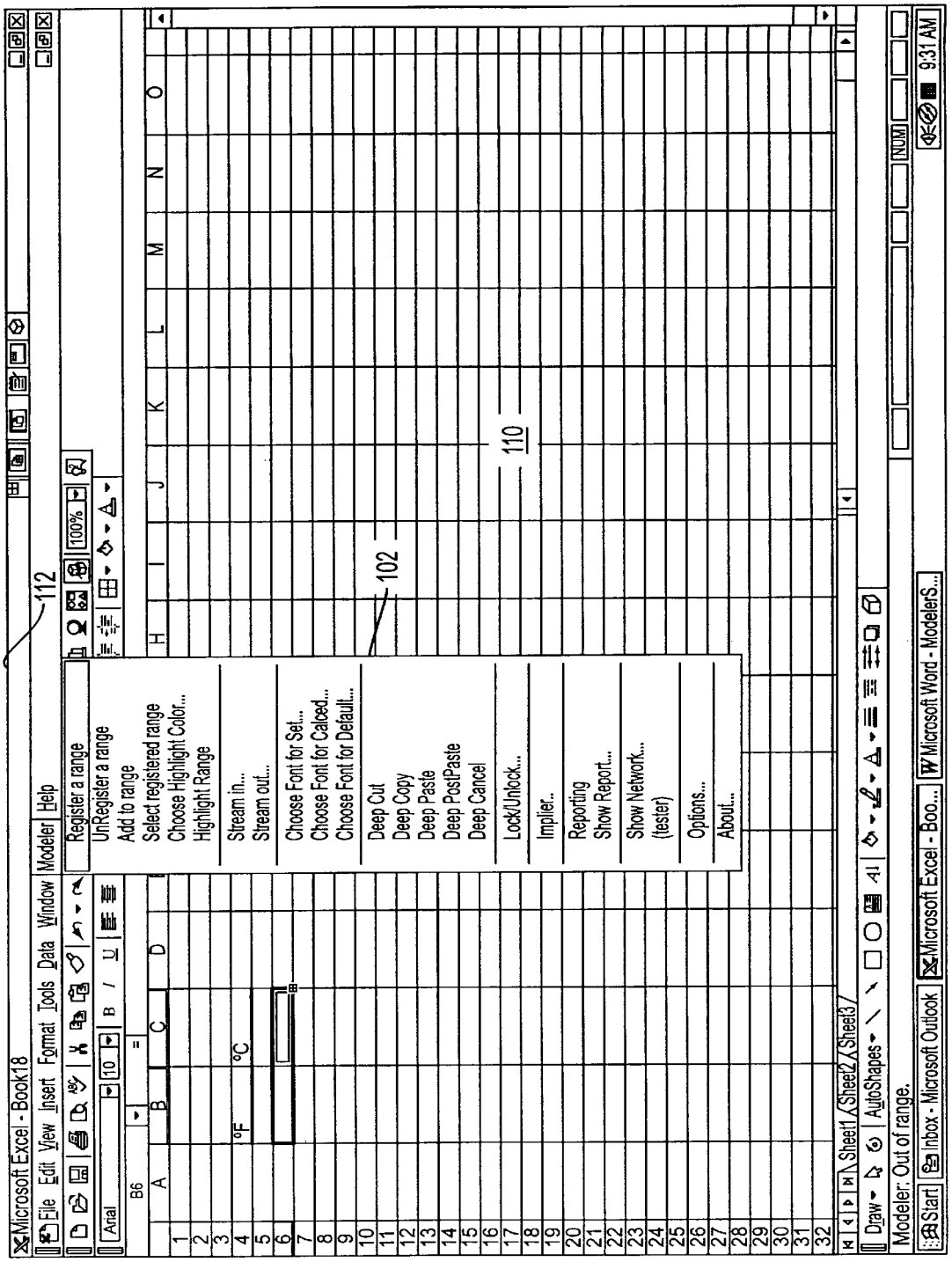

In an exemplary application of the Modeler, with reference to FIG. 5, a matrix can be set up in spreadsheet 110 for converting Fahrenheit temperatures into Celsius. Selector 108 can be used to select and enter temperature data into fields selected from spreadsheet 110. In FIG. 5, the user has entered column labels °F. and °C. to indicate that column B is going to contain data representing temperatures on the Fahrenheit scale, and column C is going to contain data representing temperatures on the Celsius scale.

When used as an add-on to a spreadsheet, the preferred embodiment of the present invention allows the user to indicate a range of fields on spreadsheet 110 using the shift-key and the arrow keys on a standard personal computer keyboard, or by clicking the left mouse button on a the personal computer's mouse and dragging the mouse across fields. Once at least one of the plurality of fields in spreadsheet 110 are indicated, the user may then choose the Register Range selection from menu 102 as indicated at 112. After selection of Register Range 112, the fields which were indicated are then registered within the Modeler's memory space.

Figure 6:
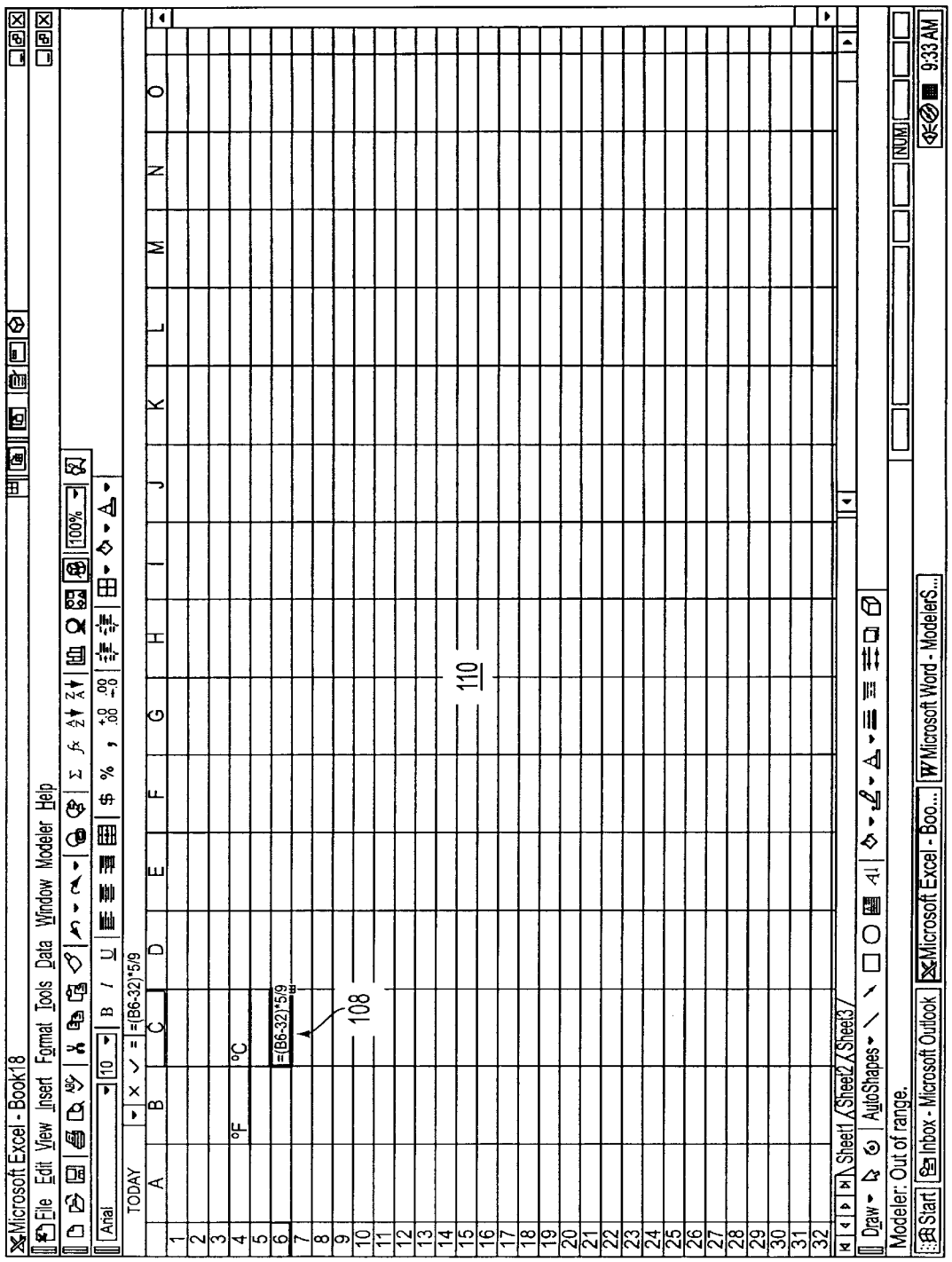

With reference to FIG. 6, as is the case using standard spreadsheets, the Modeler allows the user to enter formulas into fields which use other fields as operands. In FIG. 6, the user is currently entering a formula into field C6 which takes data from field B6 as input and subtracts 32, multiplies the result by 5 and then divides by 9, which is the formula for converting temperatures on the Fahrenheit scale to comply with the Celsius scale. In a standard spreadsheet, entering a formula into a field would indicate that the user would like to designate that field as an output field to display the result of that formula. However, in the present invention, entry of a formula into a field which has been registered in the Modeler does not cause such a designation; the field can be used to input data as well as for output. The field in which the formula was entered into becomes the output, or target, field for the formula, and the formula is stored in the Modeler as a calculator.

Figure 7:
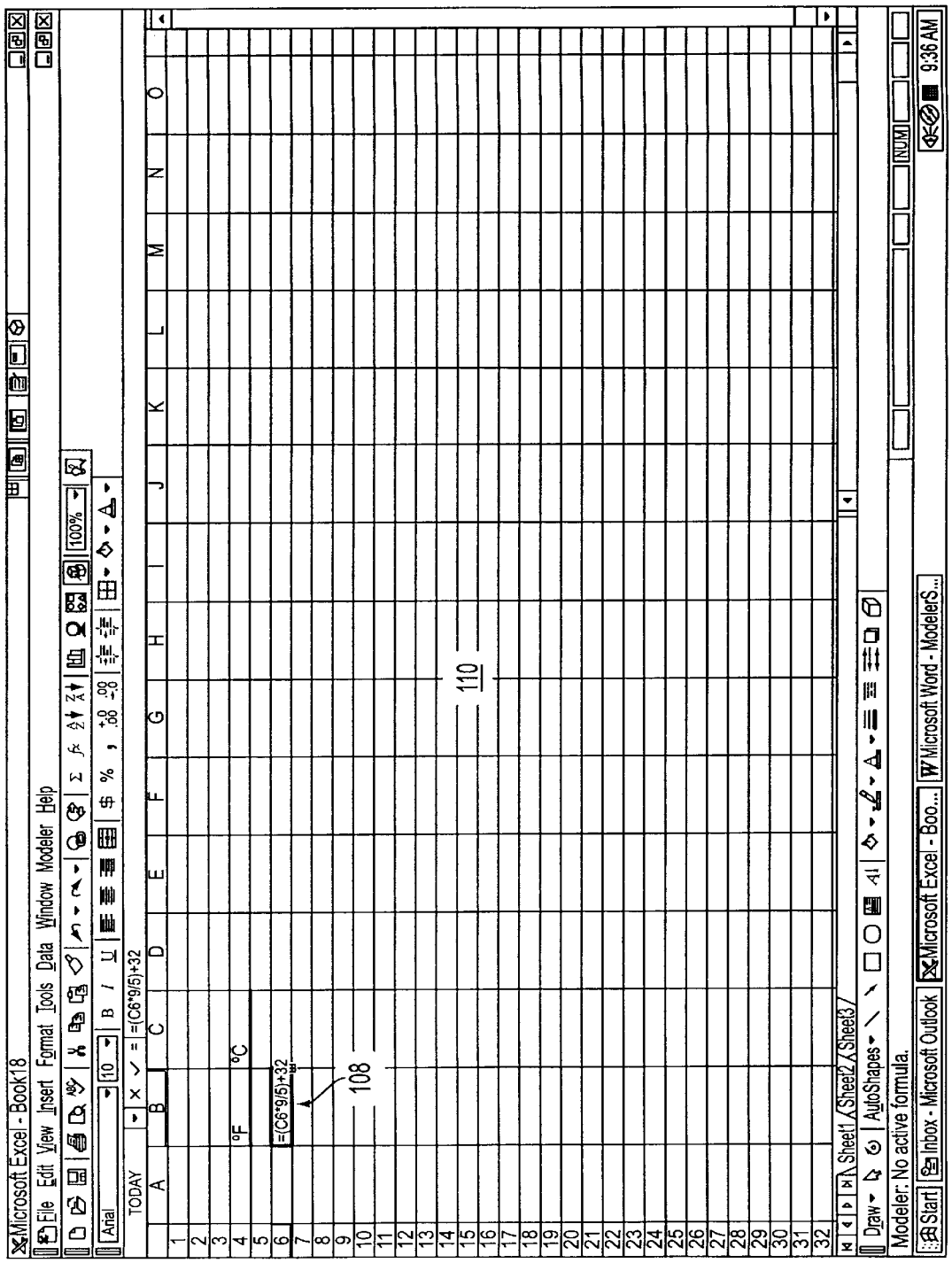

With reference to FIG. 7, after entering the formula into field C6, the user may then move selector 108 to field B6 in spreadsheet 110. In FIG. 7, the user is currently entering a formula for converting Celsius temperatures into Fahrenheit into field B6 which takes data from C6 as input and multiplies it by 9, and the divides the result by 5, and then adds 32. The Modeler retrieves this formula and stores it as a calculator.

It is noteworthy that inputting this formula into field B6 causes a circular reference because it uses field C6 as input and the formula entered into field C6 uses the data from field B6 as input. Normally, had the fields not been registered with the Modeler, an error message would have been produced by the electronic spreadsheet program for display, reminding the user that circular references can not be used. The formulas in the fields with the circular references would not be computed. However, the Modeler preempts the error message for the circular reference as to fields which have been registered in the Modeler's memory, and the formulas remain valid and are calculated as explained below. For the formula entered into C6, the Modeler stores it as a calculator with a target of C6 which uses B6 as an operand. It is further noteworthy that the formula entered into cell B6 is the inverse of the formula entered into cell C6.

Figure 8:
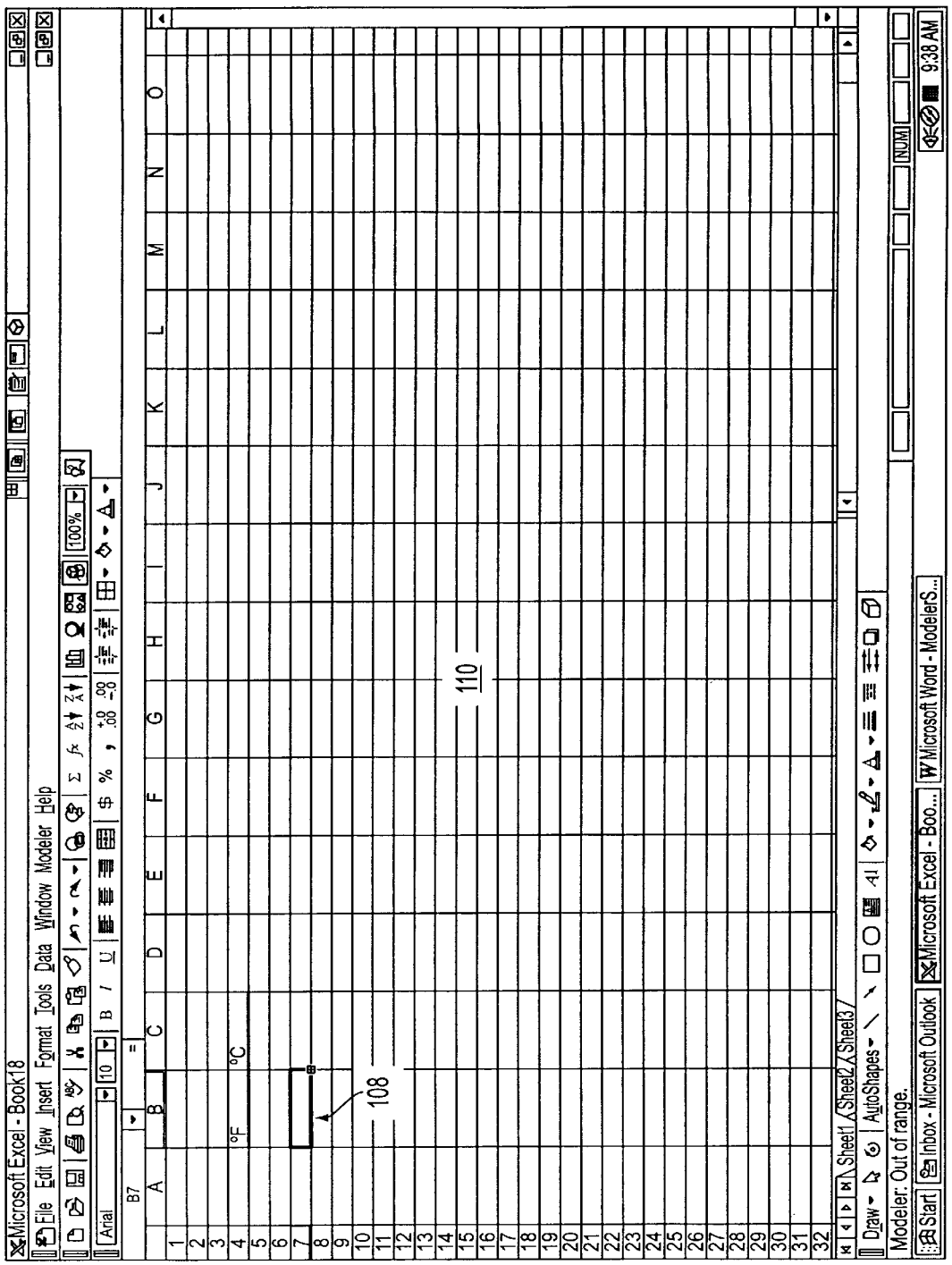

With reference to FIG. 8, after the calculators have been entered into the registered range of fields, selector 108 has been moved off of field B6 for further entry of data or formulas. It should be noted that once calculators have been entered into registered fields B6 and C6, no values appear on the screen in those fields. This is because there are no input values specified which could trigger calculation, or propagation. Unlike standard spreadsheets, the Modeler treats empty fields as empty, not as synonymous with zero.

Figure 9:
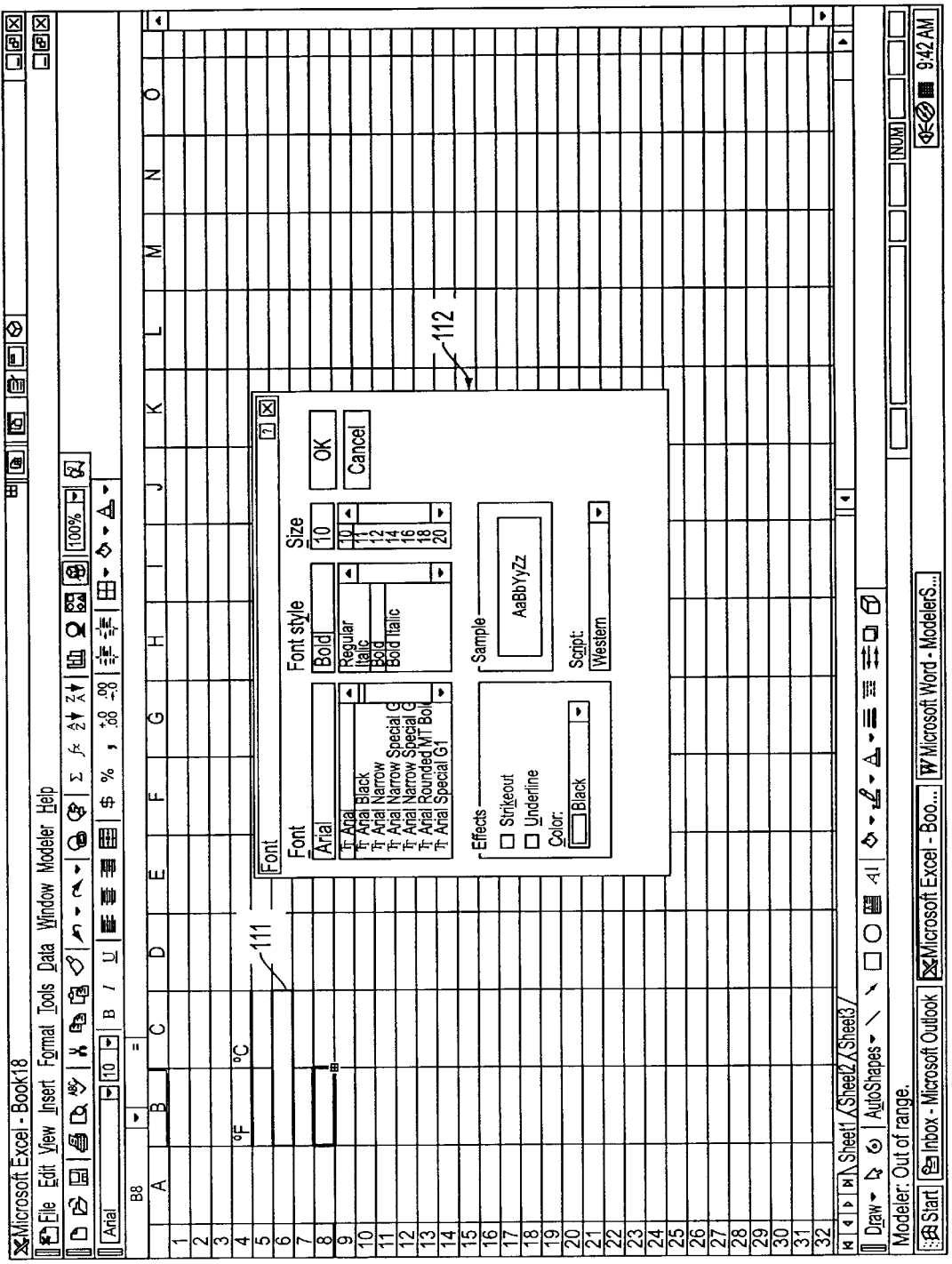

If the user wishes to be reminded of the boundaries of the range of fields currently registered in the Modeler's memory, the Highlight Range selection on menu 102 (FIG. 4) can be used to cause all the fields in registered ranges in spreadsheet 110 to be highlighted with a highlight color chosen by the user. With reference to FIG. 9, fields B6 and C6 which have been registered are highlighted as indicated by the box 111 surrounding those fields.

As indicated above, one of the selections on menu 102 is Choose Font for Set. With reference to FIG. 9, when the Choose Font for Set selection from menu 102 is selected, the Modeler displays a Font dialog box 112 for allowing users to choose the font style and color for the highlighted range 111.

Figure 10:
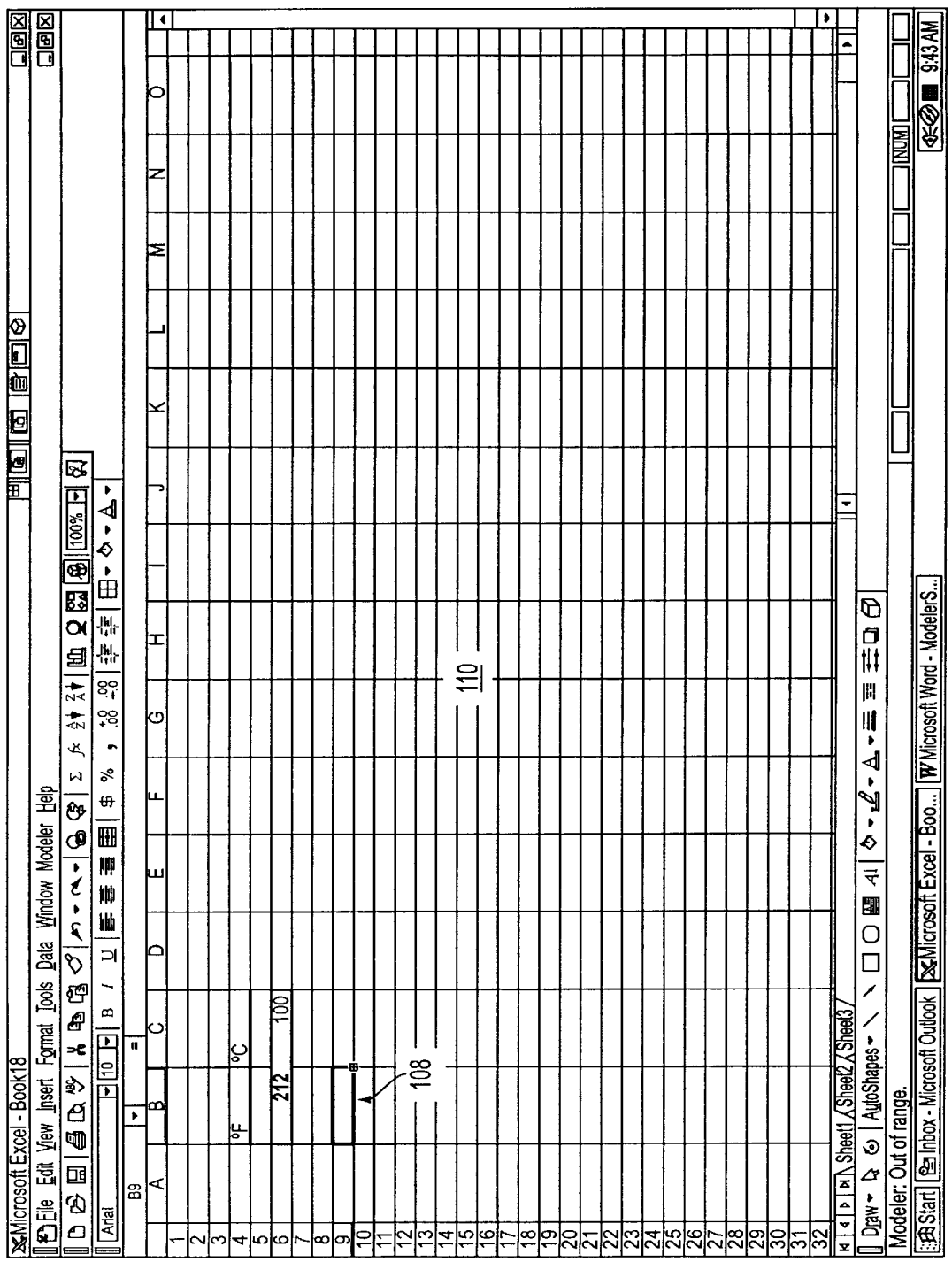

With reference to FIG. 10, if the user enters the number 212 into field B6 for a temperature on the Fahrenheit scale, thus creating a setter, the Modeler will set the value to display in bold. The equivalent Celsius value is calculated using the formula which was previously entered into field C6 in non-bold type. As described above, the Modeler propagates the calculators which use field B6 as an operand.

The Modeler further deals with the circular reference by checking or propagating the calculators for which field B6 is an operand against those for which B6 is a target. The network checks to see if the circular formulas solve for each other to produce results which do not conflict. For example, the representation for the formula entered by the user into field C6 is:

$$C6 = \frac{(B6-32)*5}{9}$$

The representation of the solution for B6 is:

$$B6 = \frac{(C6*9)}{5} + 32$$

which is in fact the same formula as entered in field B6. Therefore, the operand entered into field B6 does not conflict with the calculator which uses field B6 as a target. If there had been a conflict, then the values in fields B6 and C6 would be suppressed because the calculators are not proper inverses of one another and correction of the calculators is required.

Figure 11:
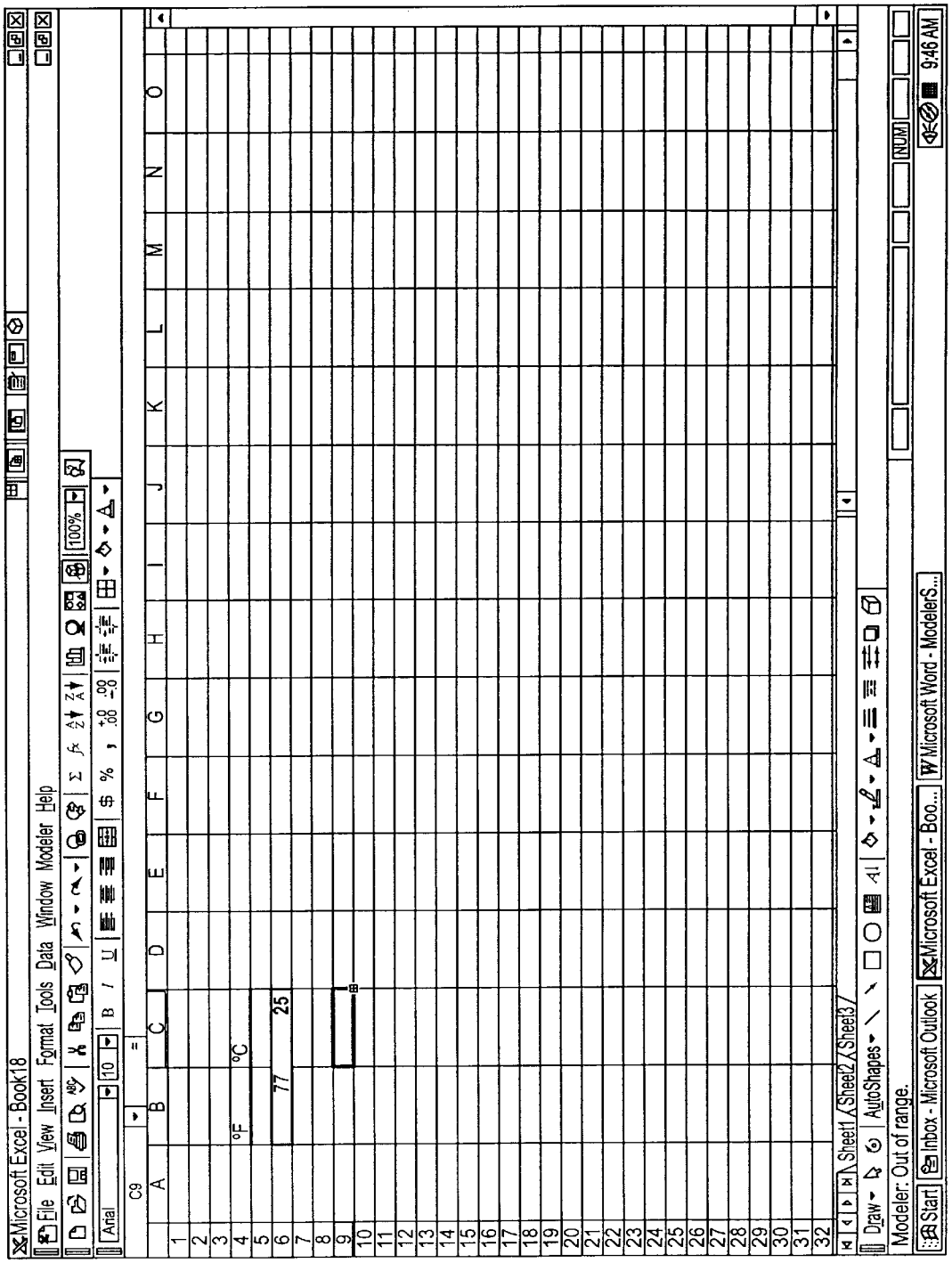

With reference to FIG. 11, if the user enters the value 25 into field C6 for the Celsius temperature, the value of 25 will be displayed in bold in field C6. In similar fashion to that explained above, the resulting output of the Fahrenheit equivalent of 77 will be calculated by the calculator which targets field B6, taking the value entered into field C6 as an operand. At this point, the Modeler will find a conflict in the previously input value of 212 in field B6 (FIG. 10).

The Modeler resolves this conflict using the hierarchy of last input fields in its memory so that priority is given to the latest values that are entered if such conflicts are found. Thus, the input value of 212 is suppressed. The new, calculated value of 77 will be displayed in non-bold to indicate that the value of 77 was calculated as output and entered into field B6. The value of 212 previously in field B6 has not been erased, only suppressed. If the user erased the resulting value of 77 in field B6 by, for example, pressing the delete key while selector 108 was on field B6, the 212 would reappear in field B6 and the calculator for field C6 would be re-activated and the result of 100 would be displayed in field C6 in a non-bold font.

Figure 12:
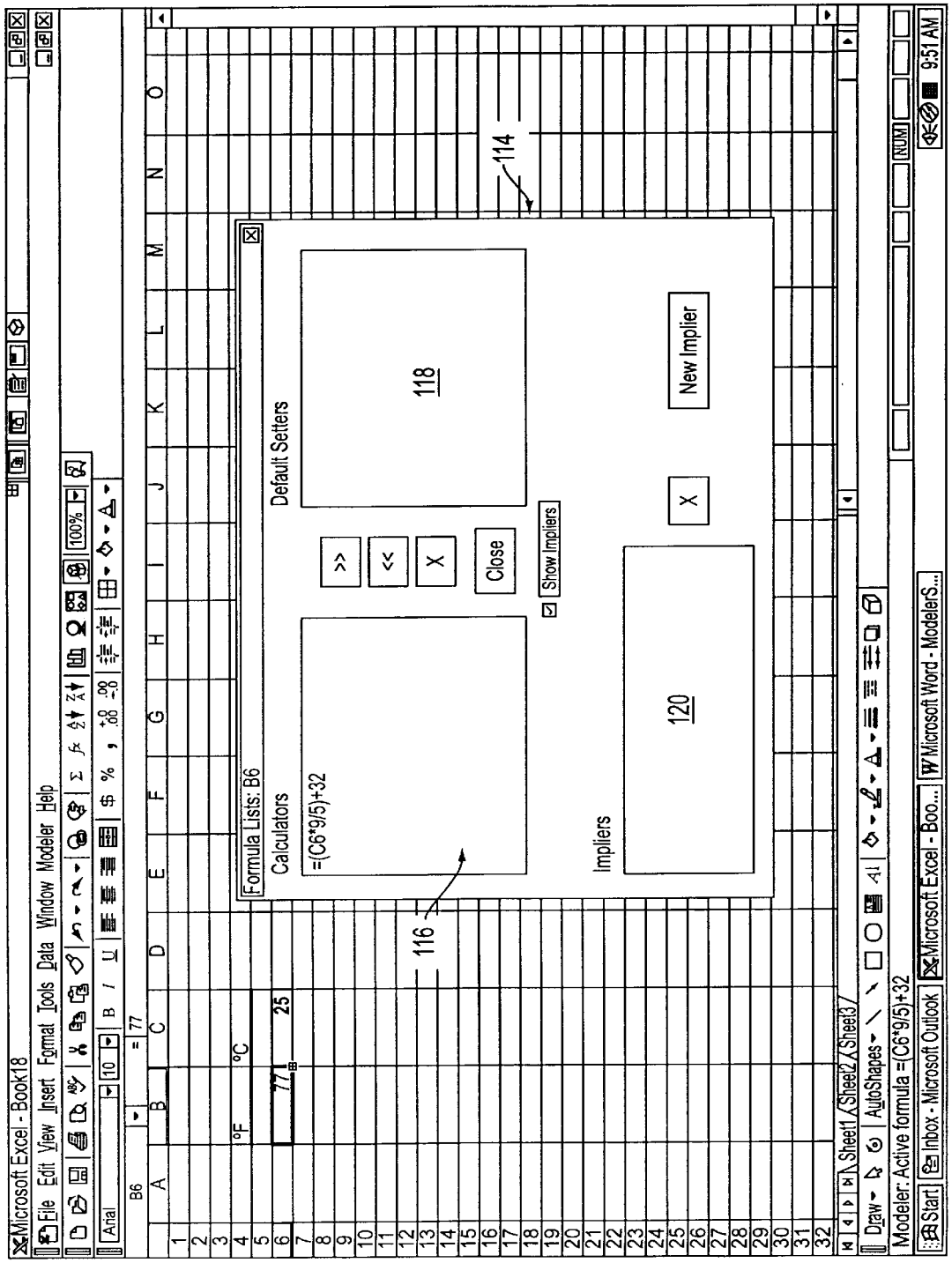

With reference to FIG. 12, if the user wishes to see the formulas for which a particular field serves as an operand in a registered range, double-clicking the mouse on the field will cause the Modeler to display a Formula Lists dialog box 114. The Formula Lists dialog box contains a calculators window 116 which contains a list all of the formulas which have been entered into fields and stored as calculators which use the field as an operand. The Formula List dialog box also contains a window 118 for display of any default setters, and a window 120 for display of any impliers.

Figure 13:
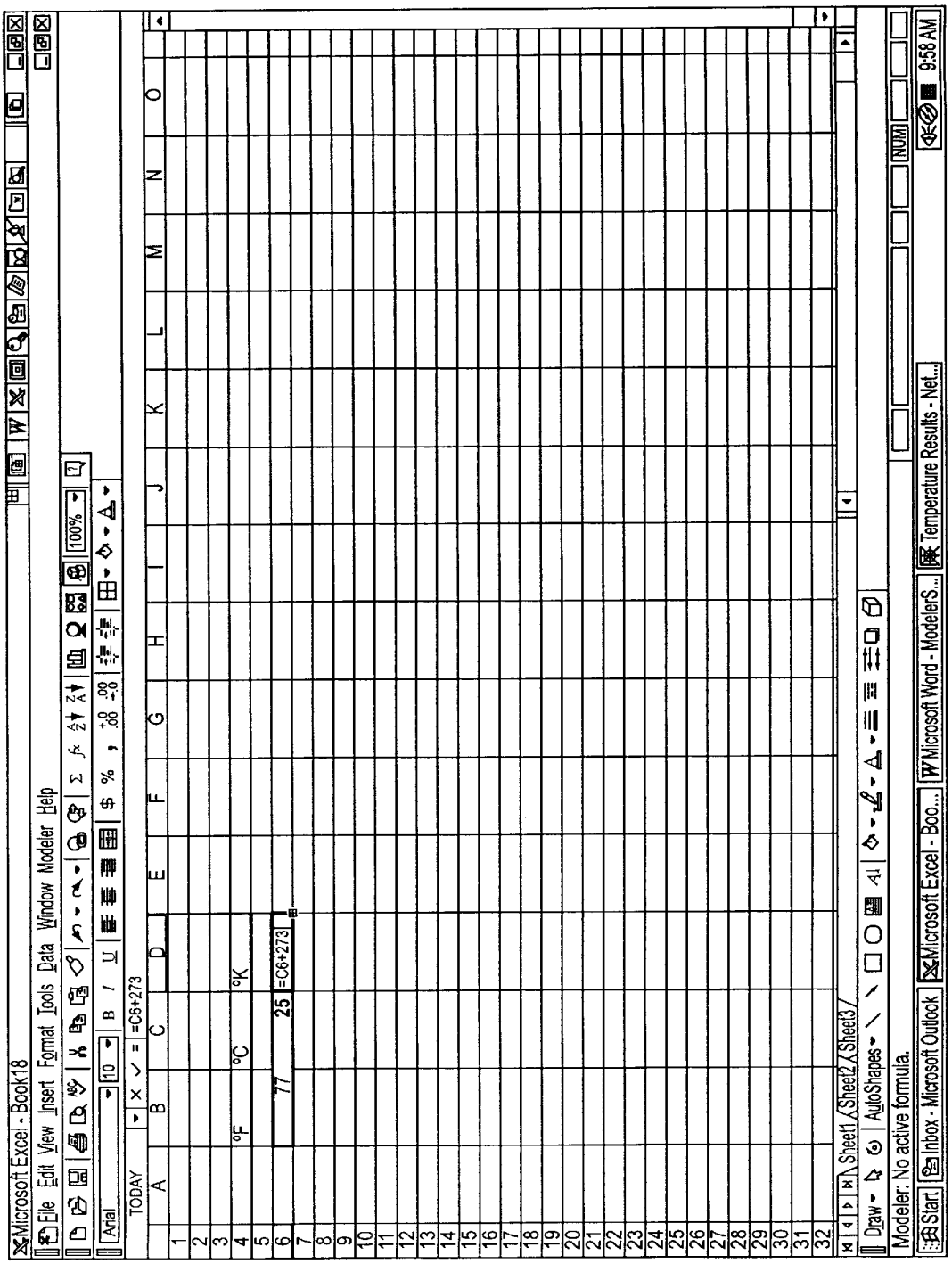

With reference to FIG. 13, the user may desire to add another field to the data network in spreadsheet 110. Using the temperature conversion example above, the user may add, for example, a column to calculate temperatures on the Kelvin scale. In FIG. 13, the user has added the symbol for Kelvin, °K., in field D4. The user can then add field D6 to the registered range by moving selector 108 to field D6 and selecting Add to Range from menu 102 (FIG. 4).

The formula for calculating temperature on the Kelvin scale may then be input. In the example in FIG. 13, the user has input a formula which takes field C6 as an operand and adds 273 to obtain the resulting conversion. As before, since D6 is part of the registered range, the formula is stored as a calculator for that field. Since the field is part of a registered range, the field is not designated as merely an output field, but possesses characteristics defined by the Modeler.

Figure 14:
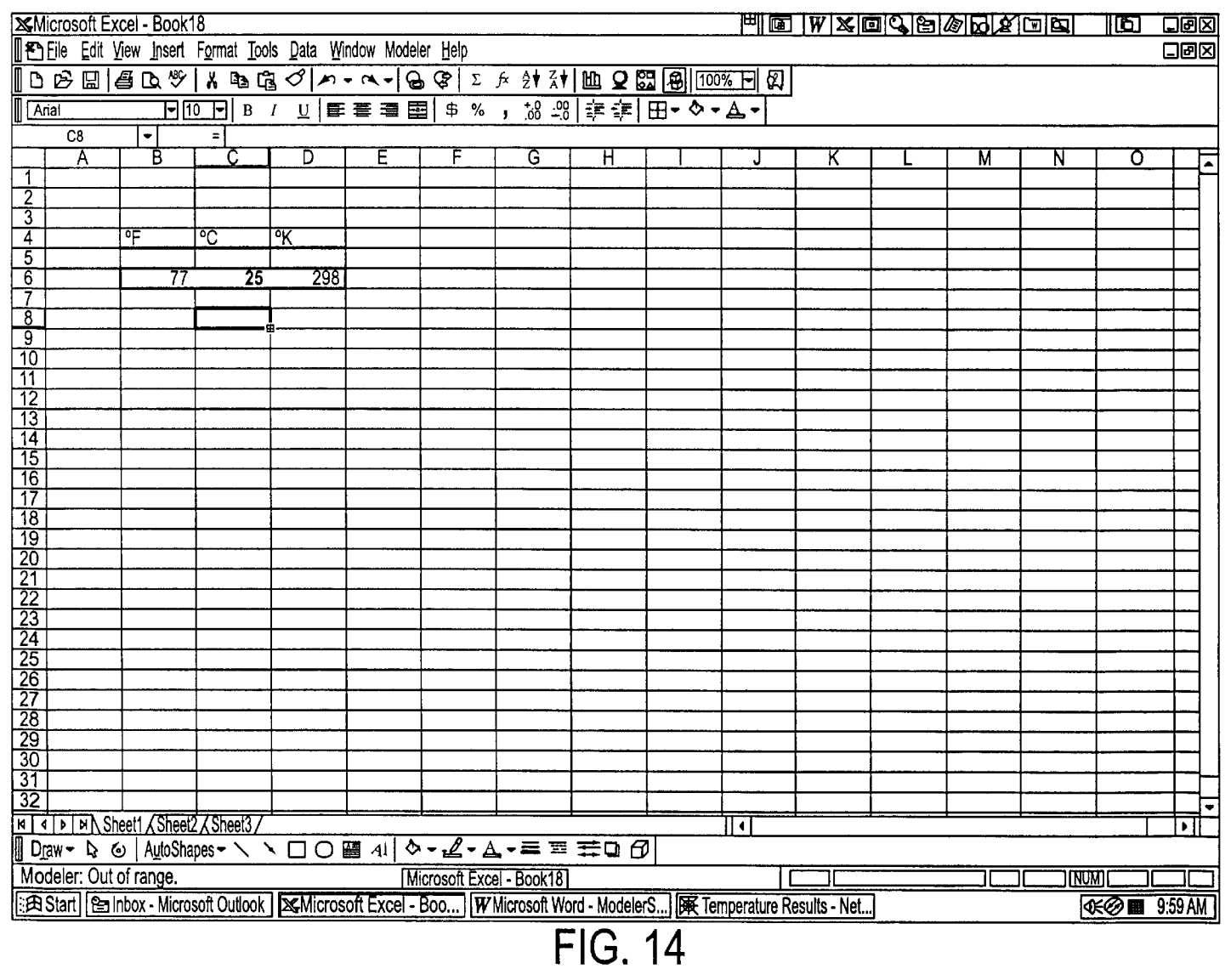

With reference to FIG. 14, since the operand field C6 has a value, the target field D6 is set to the calculated output value of 298.

Figure 15:
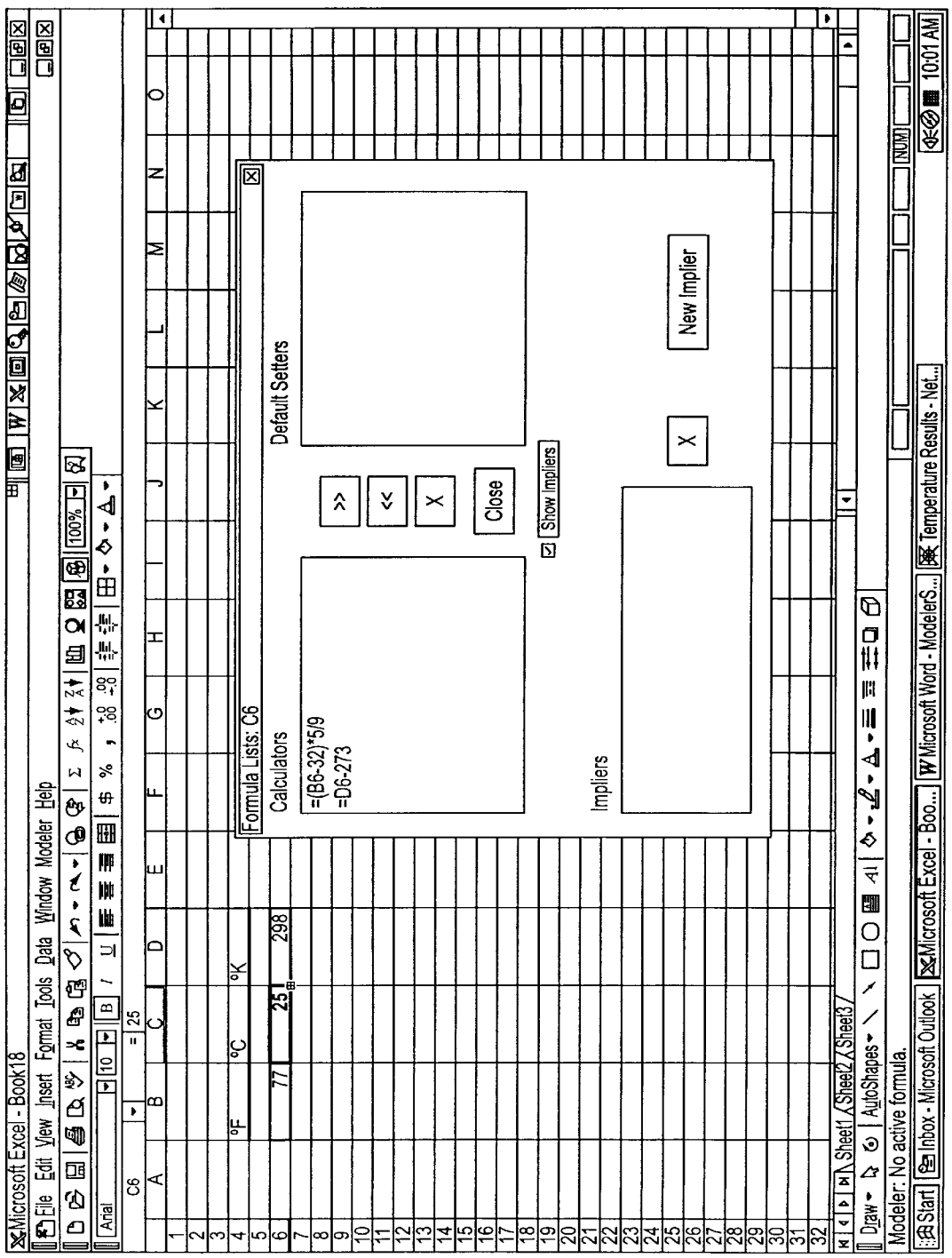

With reference to FIG. 15, if the user double clicks with the left mouse button on field C6, the Modeler again displays Formula Lists dialog box 114. As can be seen in calculators pane 116 a new calculator was automatically entered after adding the calculator which has a target of field D6 and an operand of field C6. The Modeler automatically enters the corresponding calculator by solving for the corresponding operand of the calculator for the target. In this example, the mathematical representation for the calculator with field D6 as a target field is:

$$D6 = C6 + 273$$

Conversely, the mathematical representation of the calculator with field C6 as the target field is:

$$C6 = D6 - 273$$

Figure 16:
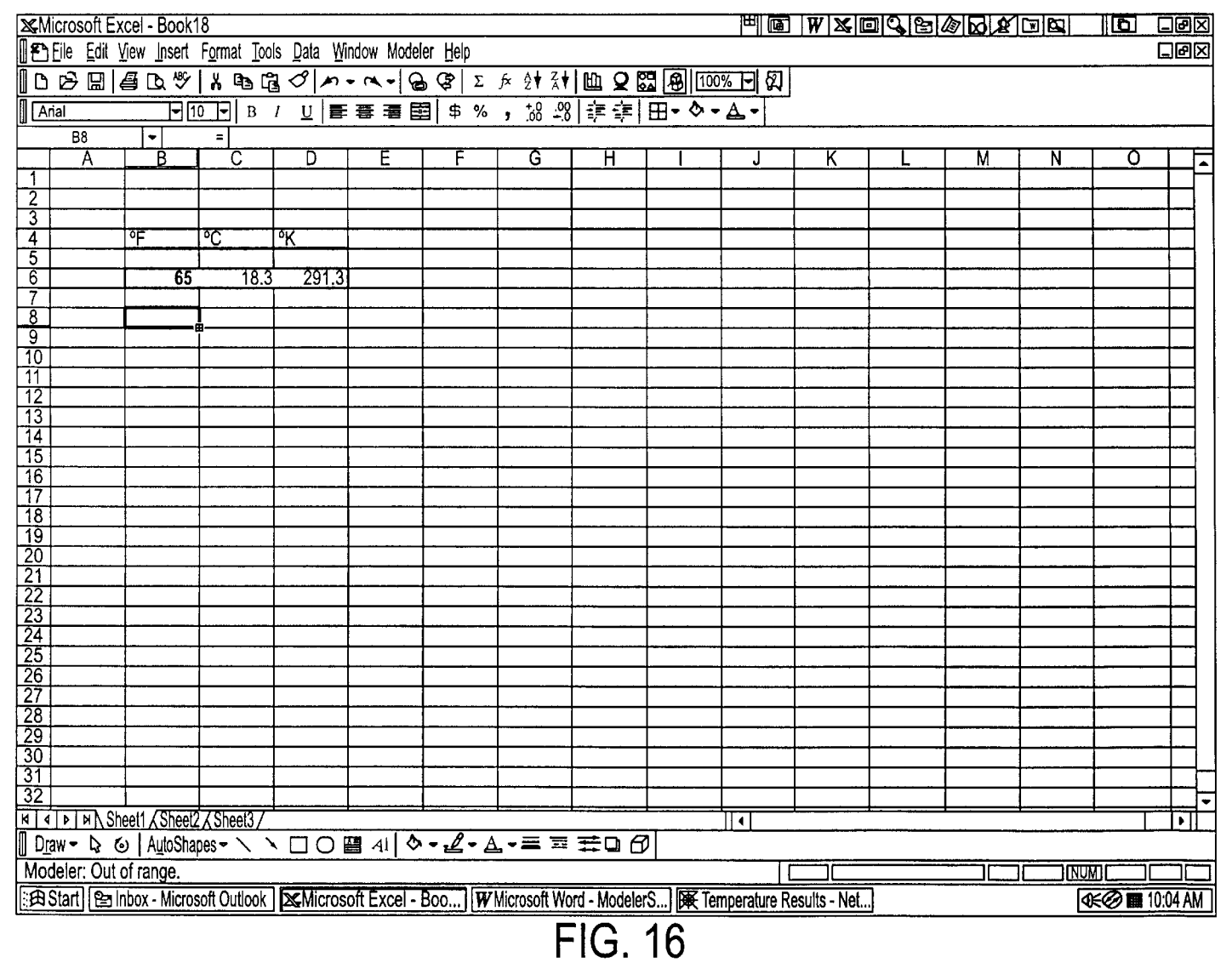

As shown in FIG. 16, the Modeler propagates an input value of 65 in field B6 to calculated values for fields C6 and D6.

If the calculator targeting field C6 is not entered by the user, the Modeler can "solve" for the equation represented by use of an implier, as described above. In this case, the implier systematically guesses values for C6, inserts the guesses into the calculator targeting field D6, and checks whether the guessed value satisfies the calculator by comparing the result with the value input for D6. The implier performs iterations of this guessing process until the result matches the input value for field D6.

Figure 17:
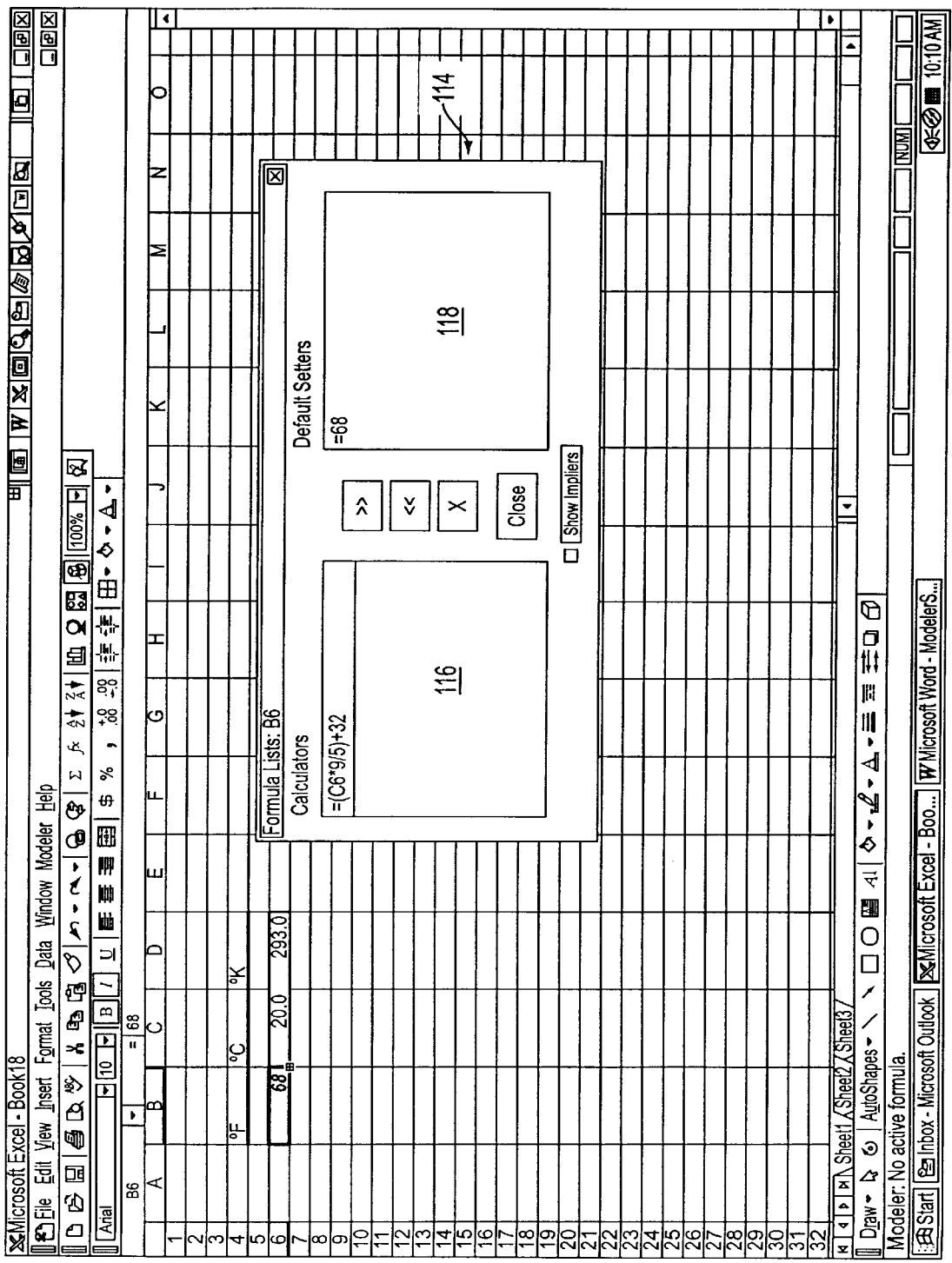

With reference to FIG. 17, the user may wish to enter a default value of 68 degrees Fahrenheit into field B6. The user may enter a default value into the Default Setters pane 118 for a particular field after displaying the Formula Lists dialog box 116 as described before. After setting this value, if no other conflicting values are given by the user or calculated by the Modeler, then field B6 will automatically receive a value of 68. This increases the likelihood that the fields in the registered range which depend from field B6 will never be blank. From then on, the default value will be displayed in the Default Setters pane of the Formula Lists dialog until it is deleted or changed. Alternatively, a calculator may be input or copy from the calculators pane 116 by clicking with the left mouse button on icon 122.

Figure 18:
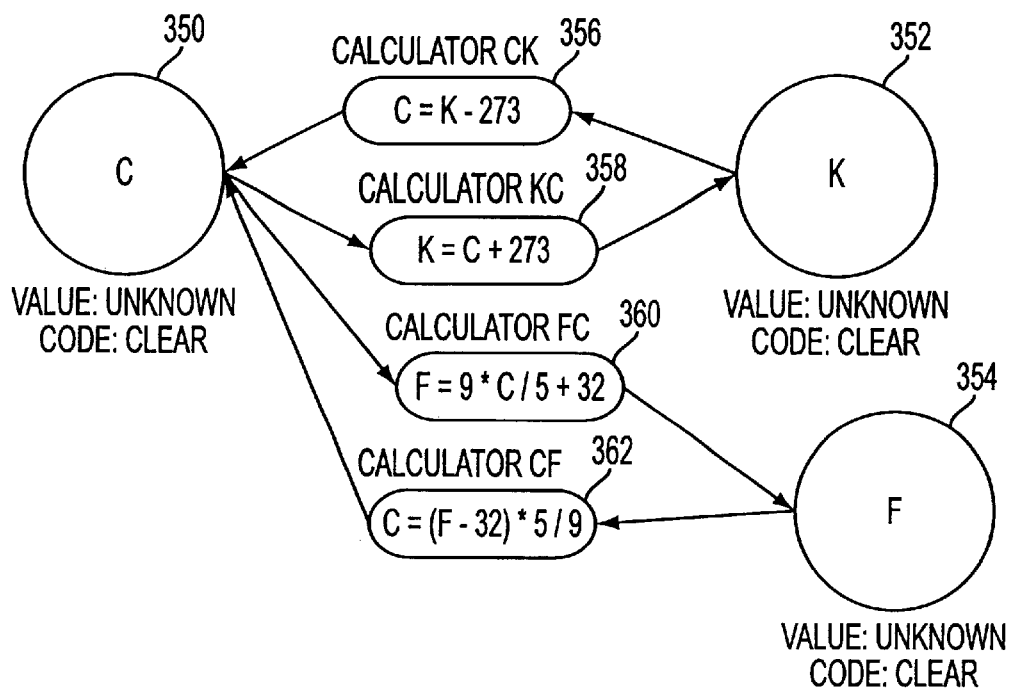
FIGS. 18–21 are state diagrams representing the states of various fields in an exemplary application of the analytic network system of FIG. 1 as various fields are set and calculated in accordance with the process shown in FIG. 2.

The process performed by the Modeler for the setting of various values in different fields of the temperature conversion engine described above is illustrated in FIGS. 18–21. Referring to FIG. 18, the data network depicted represents a temperature conversion network with no values. Each of the circles 350, 352, 354 represents a field in the network. Field 350 is the temperature in Celsius, field 354 is the temperature in Fahrenheit, and field 352 is the temperature in Kelvin. The fields are associated with a value and code, which can be Clear, Set, Calced, or Default, as explained above.

Each of the elongated circles 356, 358, 360, 362 represents a calculator. Calculator 356 calculates C from K. Calculator 358 calculates K from C. Calculator 360 calculates F from C. Calculator 362 calculates C from F. The arrows point from the operand to the calculator and from the calculator to the target.

The following is description of the series of events that occur when the user provides a value for a field in the temperature network above. Reference is also made to the steps in the propagation process as illustrated in FIG. 2.

Starting at step 200, the user specifies that the value of field 350 is 25. That value and target is stored in a setter. The setter is placed in a list and sorted, step 202. Currently, that user entered setter is the only setter in the list.

All of the codes are cleared, step 204, and each setter in the list is propagated. The only setter entered has a target of field 350 and sets it to 25, step 206. The rollback calculator list is cleared so that it can be used to reverse a setter if it fails consistency checking 208. A check is made to see if the target is clear, step 210. In this case the target, field 350 is clear and can be set to 25. The code for field 350 is changed to Set, step 212.

The target field 350 is checked to see it is an operand for any calculators, step 215. Field 350 is an operand for calculators 358 and 360. Thus, calculators 358 and 360 are examined to see if all of their operands are known, step 216. Considering calculator 360 first, all of the operands, being only field 350, are known. Next calculator 360 is checked for value dependency, step 220. Calculator 360 does not have value dependency, so the value is Calculated for the output of 77, step 224. Next the target for calculator 360, field 354, is checked to see if it has a value, step 226. Field 352 does not have a value, so it is set to the calculated value, and its code is changed to Calced, step 228. Calculator 360 is then added to the list of rollback calculators, step 242.

Field 354 is an operand for the calculator 362, so processing moves back to step 216 with the current calculator being calculator 362 and the target being field 350. When this propagation is done, processing will go back to step 218 to consider calculator 358. Calculator 362 goes to steps 216, 220, 224, where it calculates the value to be 25, and then step 226. Since field 350 already has a value, a check is made to see if the calculated and the target values match, step 232. They do, so processing moves to the next calculator, which is calculator 358 with the target field 352.

Calculator 358 propagates identically to that described above for calculator 360 and calculates the value of field 352 to be 298. When all of the calculators are propagated, processing moves to step 240. Since there are no more setters, propagation is done.

Figure 19:
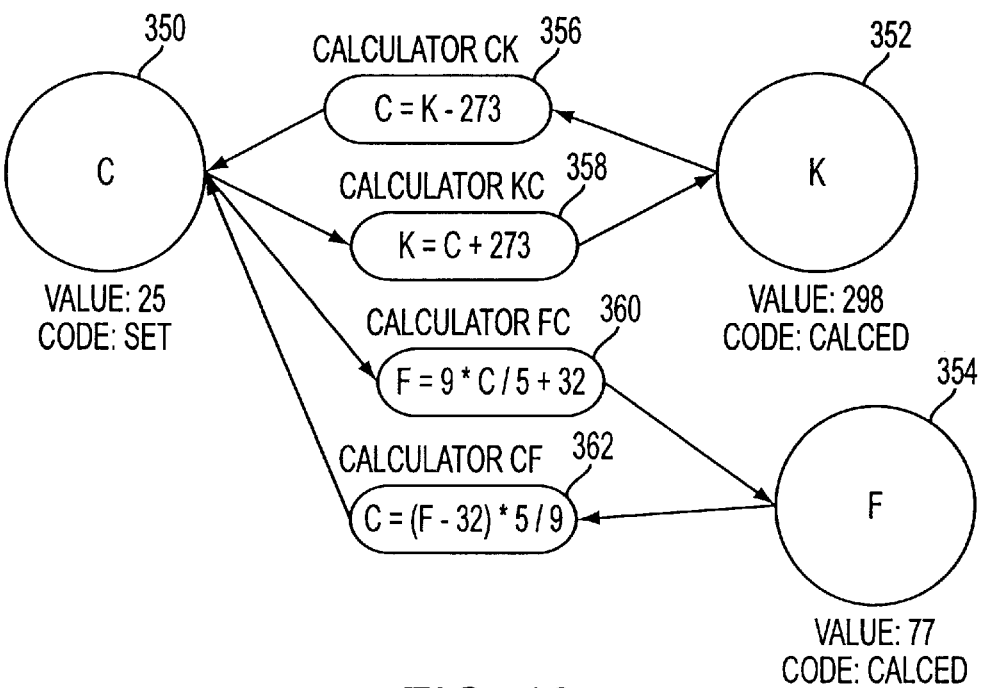

At the end of the propagation of the setter described above, the setting network can be represented by the network diagram in FIG. 19.

If the user types in the value 212 in Field F, the value and target are stored in a setter, step , which is put in the setter list. Since these setters, the one setting C to 25 and the new one setting F to 212 are identical in type, the analytic engine uses the one that sets F since it was entered last. All of the fields are cleared. The network now looks like FIG. 18.

Each setter is then propagated, starting with the setter targeting F and then the one targeting C. The rollback list is cleared. The engine checks to see if the targeted field F is clear. It is, so its value is set to 212 and its code to Set. It has one dependent calculator (CF), which is used to set field C to 100 going through steps 216, 220, 224, 226, 228, and 242. This field has the dependent calculators FC and KC. FC is propagated back to F and calculates it to be 212, which matches its current value.

Calculator KC calculates K to be 373, and starts to propagate through calculator CK, calculates C to be 100, which matches its current value. The propagation of the setter targeting F is then complete.

Next we consider the setter targeting F again. Its target is not clear so we consider the setter targeting C. Its target is also not clear. There are no more setters, so the process is complete. The effect in the application is that the user-provided value for C is replaced by the value calculated from F being set to 212. The value is not forgotten, it just was not used in the propagation. If the user were to remove the value 212 from F, then the only setter in the list would be the one that sets C to 25 and it would propagate just as it did in FIG. 19.

Figure 20:
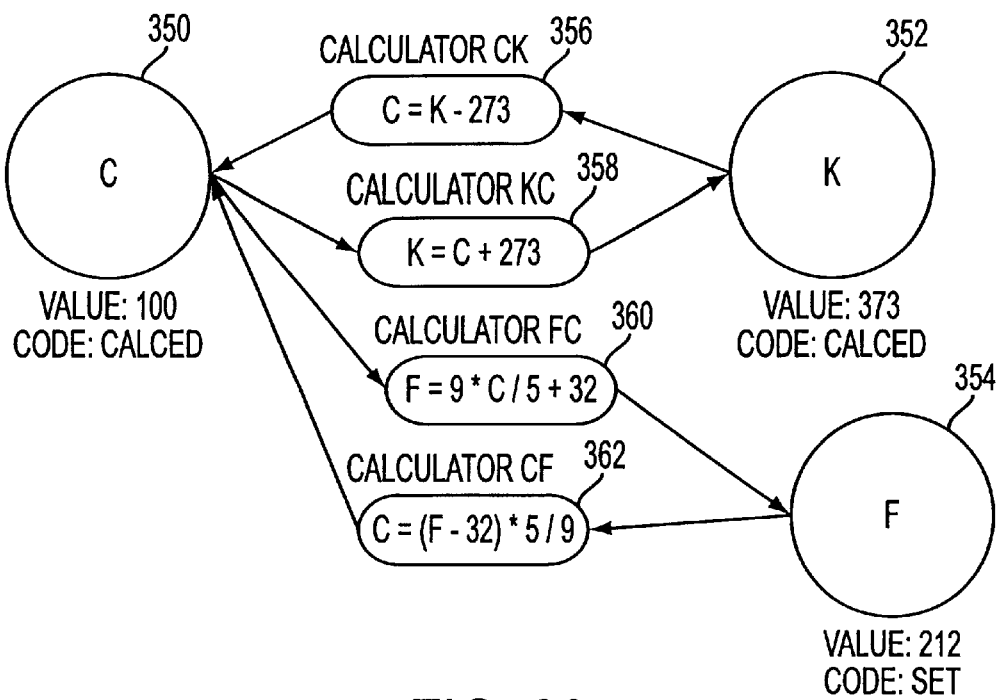

At the end of the propagation of this setter the setting network looks like FIG. 20.

Assuming next that there are two setters added to this system, the first one targeting K to 273, and the second one targeting F to 212. The sequence of events is described in what follows.

The user provides the values and they are put into the setter list, and the fields are cleared. Using the setter targeting K first, the engine follows steps 208, 210, 214, and 215. Field K has no dependent calculators, so the process returns to the beginning, trying K again which will do nothing since K already has the value 273.

Next, the engine attempts to set F. The setter is applied to F which sets it to 212. Field F has the one dependent calculator CF which is used to set C to 100. The calculator CF is entered into the rollback list. The engine checks to see if C has any dependent calculators—it does—KC. Calculator KC is used to calculate a value for K. At this point, K already has the value 273, so the engine checks to see if that matches the one calculated by KC. Since it does not (273 vs. 373), the effects of the current setter must be reversed. First, the target of every calculator in the rollback calculator list is cleared. The only calculator there is CF, so field C is cleared. Next field F is cleared, since that is the target of the setter being propagated. There are no more setters, so the process is complete.

Figure 21:
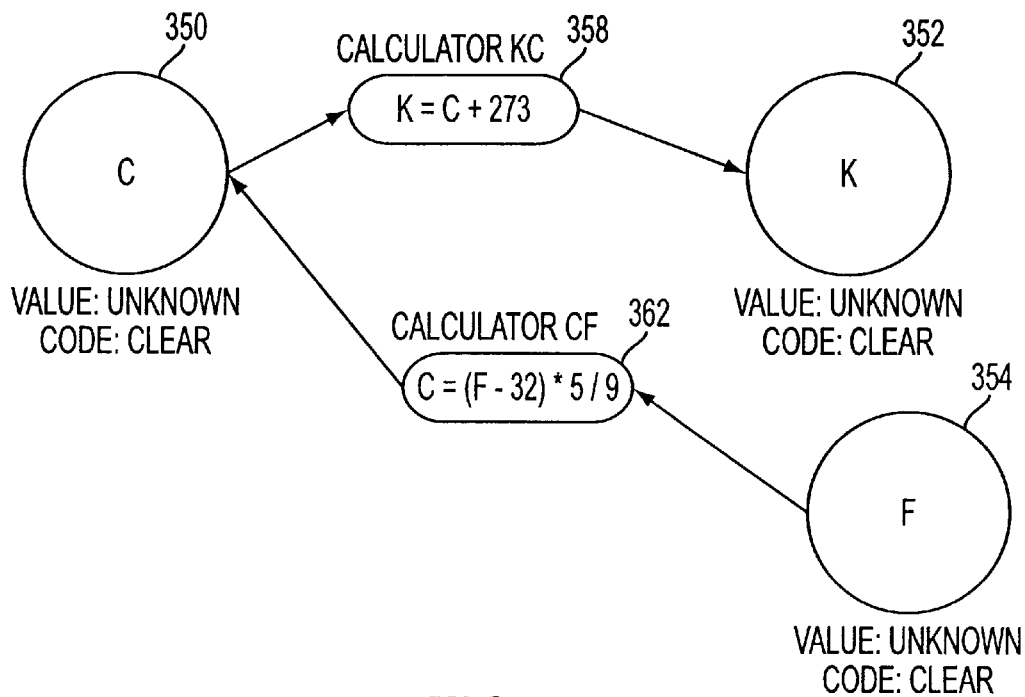

The final state of the network in this example is C: Clear; F: Clear; K: Set (273). Alternatively, field K may also be cleared, as shown in FIG. 21, since the setter targeting field K conflicts with the setter targeting field F.

Figure 22:
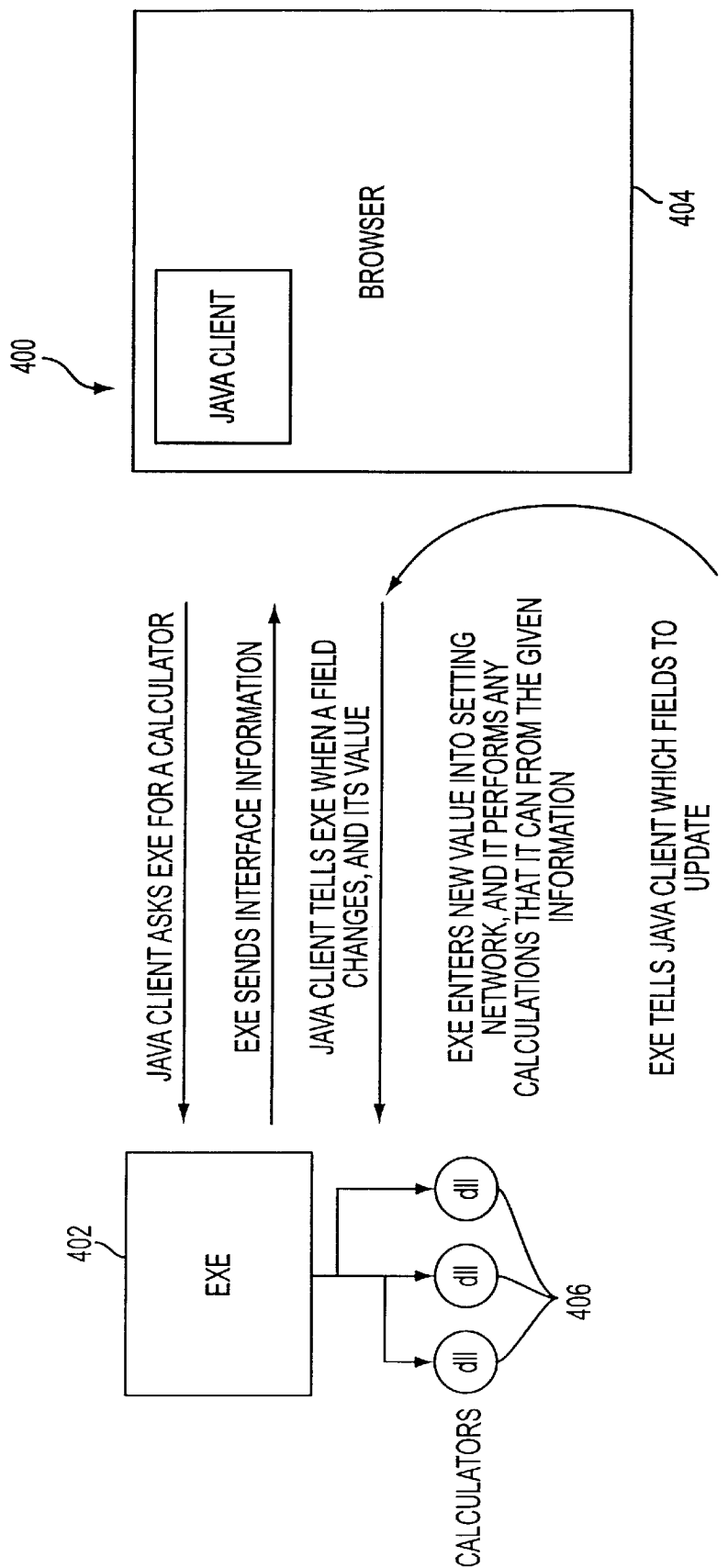
FIG. 22 is a flow diagram of an analytic network system implemented in a client/server environment.

An alternative system architecture for implementation of an analytic engine in a client/server environment such as the Internet is illustrated in FIG. 22. The system shown in FIG. 22 consists of an executable program 402 operating on a server, a Java applet 404 or other client side control or routine operating on a remotely located client, and one or more DLLs which contain the individual page drivers representing the calculators. Each DLL 406 implements one calculator.

The server executable 402 is responsible only for communication with the Java client. All calculations are performed in the DLLs 406. DLLs can be added after the executable has started—the executable will load them when the Java client requests a calculator for which there is no DLL currently loaded. When the Java client asks the executable for a calculator, the executable asks the appropriate DLL for the setup string. The setup string contains all necessary information about what user interface controls are needed for the calculator. The setup string is sent to the Java client, and it places the appropriate controls on the screen. When a user types something into one of the fields, the Java client sends that information to the executable. The executable enters that information into the setting network and performs any calculations it can based on that information. Then, any new values are sent to the Java client and it displays them.

Figure 23:
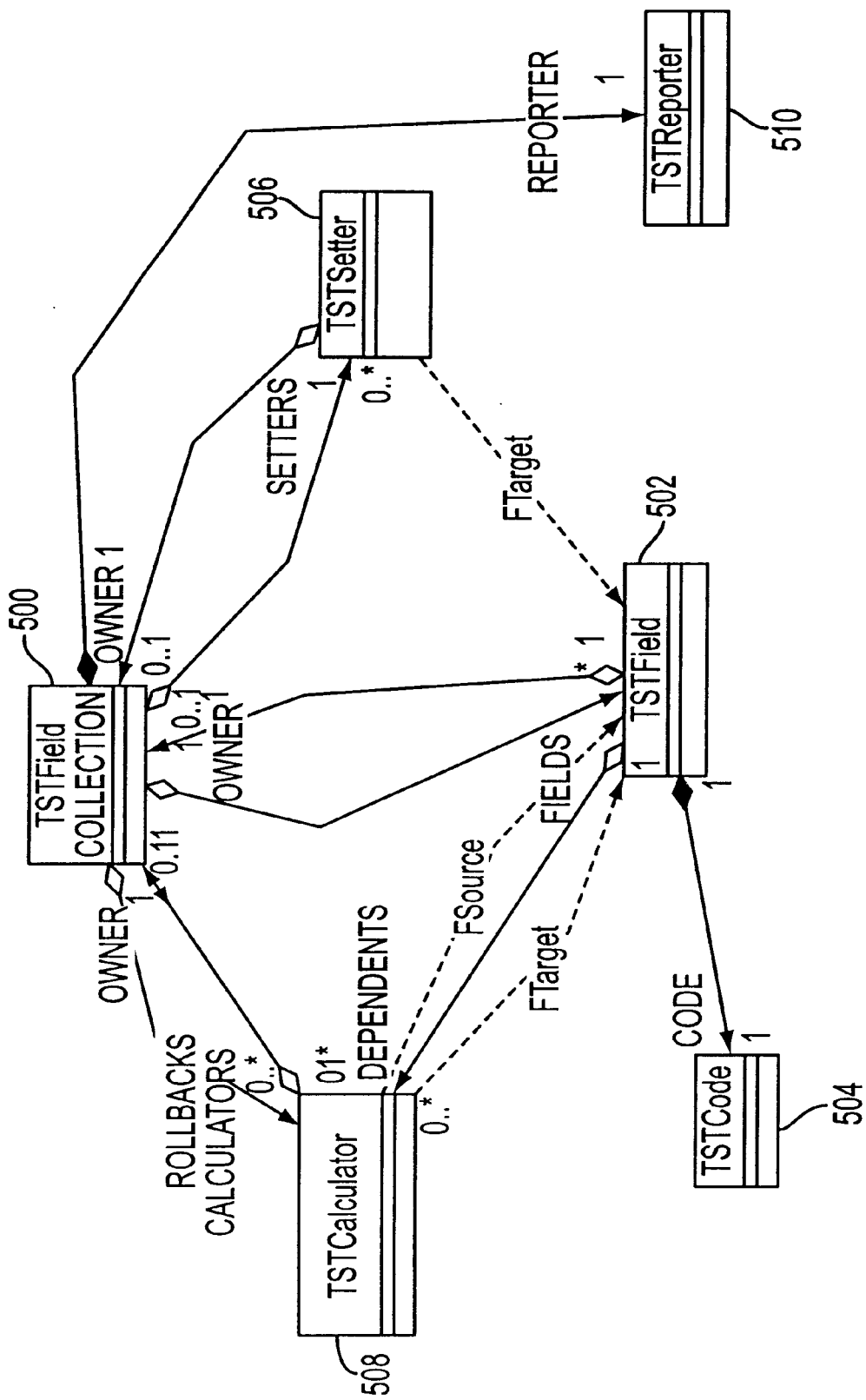
FIGS. 23–24 are diagrams showing a classes used to implement the various elements of the analytic network system shown in FIG. 1 in some embodiments of the present invention.
Figure 24:
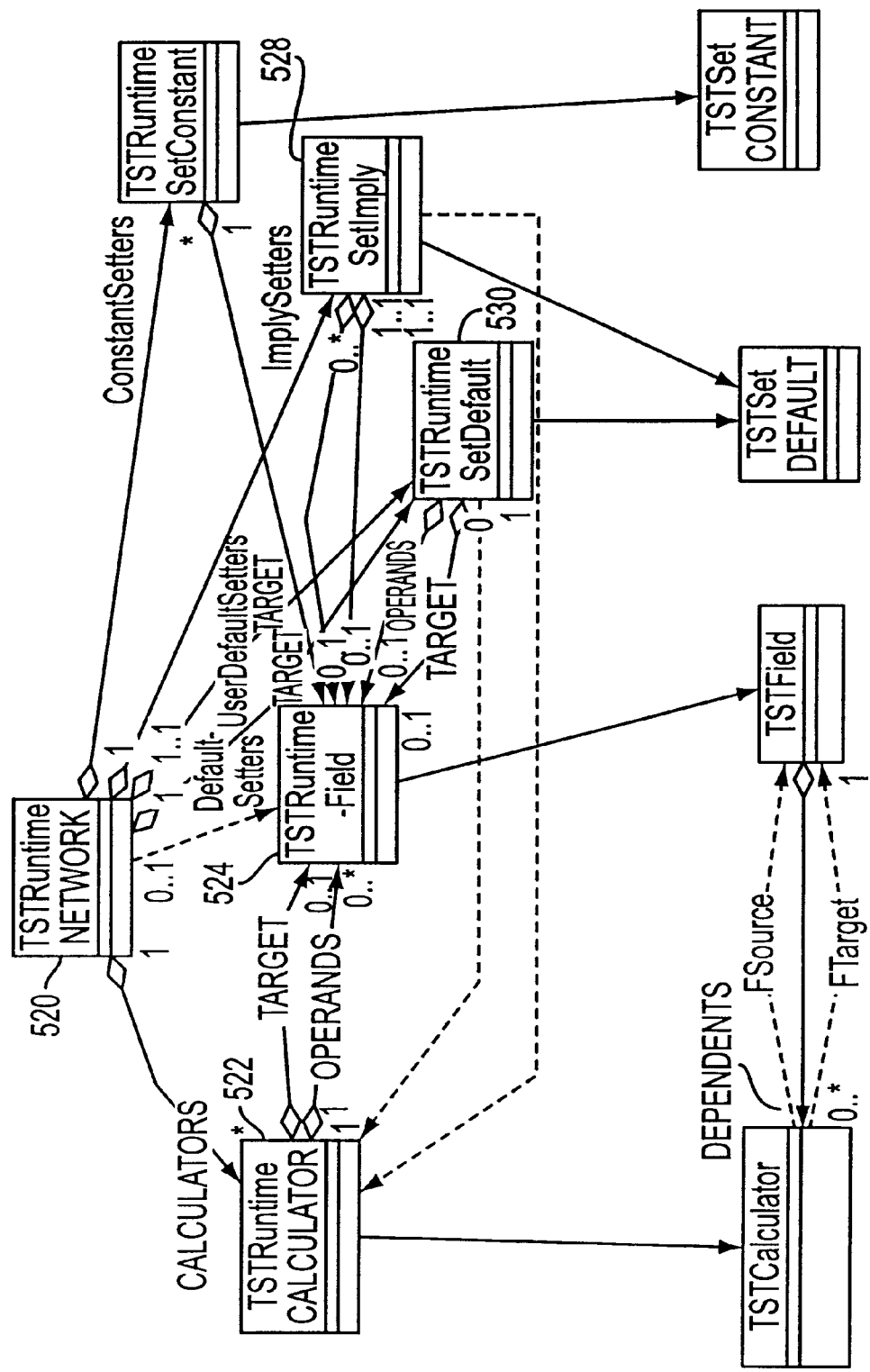

FIGS. 23–24 depict a variety of object-oriented classes which may be used to implement the analytic network described herein and their relationships. The core classes and their relationship are depicted in FIG. 23. These include a class TSTFieldCollection 500 for representing the field collection, a class TSTField 502 for the individual fields in the collection, a class TSTCode for storing the codes associated with the fields, a class TSTSetter 506 for the setters, and a class TSTCalculator 508 for the calculators. The field collection class manages the setting and propagation process as described herein, and a class TSTReporter 510 tracks and logs the activity of the field collection class for debugging purposes.

The TSTField object 502 holds a value for a given field. The field is connected via an observer relationship to other objects and systems. The TSTField object 502 contains methods for adding calculators to the field's list of dependent calculators (which is called by the calculator object on all of its source fields when it has determined that it can connect to a collection), removing a calculator from the dependent list, and setting the field to a default value.

The TSTFieldCollection object 500 represents a field collection which owns fields, setters and calculators. The field collection object maintains all global state information and provides services that allow fields, setters and calculators to interact. The object 500 includes methods that add and remove fields, calculators, and setters from a collection, attempt to set the field in each setter without creating an inconsistent collection in accordance with the logic provided herein, and reset all fields during a value propagation process. The objects further includes methods for adding calculators to the rollback list, iterating through values on the rollback list, and marking calculators on the rollback list as used. The field collection object can also search for a specific field in the collection by a unique field ID assigned to each field.

The TSTCalculator object 508 represents a calculator which establishes a relationship between two or more fields, including the target field set by the calculator (indicated in FIG. 23 as FTarget) and the one or more source fields used as input to the calculator (indicated in FIG. 23 as FSource). The calculator object has methods for attempting to calculate a value to place in the target field and returning a logical false if setting the field would create an inconsistent collection or returning a successful calculation to register the calculator as used in the field collection. The calculator object 508 further contains a method for resetting a field value to its prior value as part of a rollback procedure.

The TSTSetter object 506 represents a setter which inserts a value into a target field (FTarget) if no value is there already. A priority level property in the setter object 506, used to order the setters as described herein, is set according to whether the target field should never be clear, should be treated normally, or should be calculated if possible rather than set with a setter. The setter object 506 includes methods for setting the field to a stored value and setting a field to its prior value, which may be a setting of clear.

As shown in FIG. 24, additional classes are used for a runtime network. These include a class TSTRuntimeNetwork 520, which is the only class needed by a client computer, and a number of classes for managing calculators, setters and fields on a run time basis, including classes TSTRuntime Calculator 522 for calculators, TSTRuntimeField 524 for fields, TSTRuntimeSetConstant 526 for constant setters, TSTRuntimeSetImply 528 for impliers, and TSTRuntimeSetDefault 530 for default setters.

The TSTRuntimeNetwork object 520 represents a network of runtime fields, calculators, and setters. The class contains methods for handling input/output operations with a spreadsheet, including methods for registering spreadsheet cells and ranges of cells into, and unregistering cells from, the network, entering data into and returning data from a cell, and returning the code for a cell. The class also contains methods for handling calculators, including methods for removing constant setters for a field, returning the number of calculators for a cell in the network, removing a calculator from a cell, returning the expression of a selected calculator, and editing the expression in a selected calculator. The methods included relating to setters include returning the number of setters and default setters for a cell, returning or editing the expression of a setter or default setter. The runtime network class 520 also contains methods for handling the logic of the propagation process as described herein, including methods for associating logical conditions to calculators and setters depending upon whether the calculators and setters can calculate or set, respectively.

The TSTRuntimeField class or object 524 represents a field suitable for input to a runtime calculator. The TSTRuntimeCalculator class 522 runs an expression using fields from the runtime field class 524. The runtime calculator class 522 includes methods for running an expression in a calculator, attempting to calculate a field, resetting a field value as part of a rollback, and hooking and unhooking a expression from fields.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A data processing system for calculating values for fields interrelated by circular formulas in a data network, comprising:
   a first calculator for calculating a first output value, wherein a first field provides an input value and a second field presents the first output value;
   a second calculator for calculating a second output value, wherein the second field provides an input value and the first field presents the second output value;
   a conflict checker for determining, after input of a value into at least one of the first field and the second field and calculation of the first output value and the second output value, whether the first output value and the second output value are computationally inconsistent values; and
   a conflict resolver for suppressing one of the first output value and the second output value upon a determination of the computationally inconsistent values.

2. The data processing system of claim 1, comprising means for entering a formula for defining a field interrelationship into the first calculator.

3. The data processing system of claim 2, comprising means for entering a formula for defining a field interrelationship into the second calculator.

4. The data processing system of claim 1, comprising a plurality of calculators defining circular interrelationships between a plurality of fields in the data network.

5. The data processing system of claim 4, comprising input means for inputting a value into one of the plurality of fields in the data network.

6. A method of calculating values for fields interrelated by circular formulas in a data network, the method comprising:
   allowing input of a value into a first field or a second field wherein the first field serves as an input value for a first calculator and the second field serves as an output value for the first calculator, and wherein the second field serves as an input value for a second calculator and the first field serves as an output value for the second calculator;
   determining after input into the first field or the second field, whether the output value for the first calculator and the output value for the second calculator are computationally inconsistent values; and
   upon a determination of computationally inconsistent values, resolving an inconsistency by suppressing the input value in the first field or second field.

7. The method of claim 6, comprising entering a formula for defining a field interrelationship into the first calculator.

8. The method of claim 7, comprising entering a formula for defining a field interrelationship into the second calculator.

9. The method of claim 6, comprising inputting a value into one of a plurality of fields interrelated by the plurality of calculators defining circular interrelationships in the data network.

10. A method for resolving circular conflicts in values in fields in a data network, comprising:
    allowing input of a value in at least a first field which calculably depends from the value in at least a second field;
    checking the value in at least the second field to determine whether the value is calculably consistent with the value in at least the first field;
    upon a determination of a calculably inconsistent value, calculably resetting the value in at least the second field so that the value in the second field is calculably consistent with the value in the first field;
    allowing input of a value in at least the second field which calculably depends from the value in at least the first field;
    checking the value in at least the first field to determine whether the value is calculably consistent with the value in at least the second field; and
    upon a determination of a calculably inconsistent value, calculably resetting the value in at least the first field so that the value in the first field is calculably consistent with the value in the second field.

11. The method of claim 10 comprising allowing input of a first value which calculably depends from the values in a plurality fields in the data network.

12. The method of claim 11 comprising recursively checking the plurality of fields to determine whether the values of the fields are calculably consistent with the value in the first field.

13. The method of claim 12 comprising recursively resetting the calculably inconsistent values in the plurality of fields until the inconsistent values are resolved.

14. For use in connection with a spreadsheet application program having a plurality of fields capable of storing a plurality of values, a method comprising:
    storing a first formula which receives as input a value from each of one or more first fields in the spreadsheet program and produces an output value to be presented in a second field in the spreadsheet program;
    storing a second formula which receives as input a value from each of one or more third fields in the spreadsheet program and produces an output to be presented in the second field;
    when input values are available in the one or more first fields or one or more third fields, evaluating both of the first formula and second formula to determine whether their inputs are available and selecting one of the first formula and second formula that has the available input; and
    using the selected formula to produce an output value for the second field.

15. The method of claim 14, wherein the step of selecting one of the formulas comprises selecting the first formula when input values are available in the one or more first fields only.

16. The method of claim 14, wherein the step of selecting one of the formulas comprises selecting one of the formulas in accordance with a predetermined priority between the formulas when input values are available in both the one or more first fields and the one or more third fields.

17. For use in connection with a spreadsheet application program having a plurality of fields capable of storing a plurality of values, a method comprising:
    storing a first formula which receives as input a value from each of one or more first fields in the spreadsheet program and produces an output value to be presented in a second field in the spreadsheet program;

storing a second formula which receives as input a value from each of one or more third fields in the spreadsheet program and produces an output to be presented in the second field;

when input values are available in both the one or more first fields and one or more third fields and wherein the input values in the one or more first fields and one or more third fields become available at different times, selecting one of the first formula and second formula based on the time at which the input values become available; and using the selected formula to produce an output value for the second field.

18. The method of claim 17, wherein the step of selecting comprises selecting the first formula when the one or more first fields have values which become available later than the values in the one or more third fields.

19. The method of claim 14, comprising storing a third formula which receives as input a value from the second field and produces an output value to be presented in one of the one or more third fields.

20. The method of claim 19, comprising when the first formula is selected and used to produce an output in the second field, using the third formula to produce the output value in the one third field.

21. For use in connection with a spreadsheet application program having a plurality of fields capable of storing a plurality of values, a method comprising:

storing a first formula which receives as input a value from each of one or more first fields in the spreadsheet program and produces an output value to be presented in a second field in the spreadsheet program;

storing a second formula which receives as input a value from each of one or more third fields in the spreadsheet program and produces an output to be presented in the second field;

storing a third formula which receives as input a value from the second field and produces an output value to be presented in one of the one or more third fields;

when input values are available in the one or more first fields or the one or more third fields, selecting one of the first formula and second formula;

using the selected formula to produce an output value for the second field; and allowing a user to input a constant value into the second field, and using the third formula to produce an output value in one of the one or more third fields.

22. The method of claim 21, comprising allowing the user to delete the constant value from the second field, and, upon deletion of the constant value, selecting one of the first formula and second formula and using the selected formula to produce an output value for the second field.

23. For use in connection with a spreadsheet application program having a plurality of fields capable of storing a plurality of values, a method comprising:

storing a first formula which receives as input a value from each of one or more first fields in the spreadsheet program and produces an output value to be presented in a second field in the spreadsheet program;

allowing a user to input a constant value in the second field;

when values are available in the one or more first fields, using the first formula to produce an output value for the second field; and in accordance with a predetermined criteria, selecting one of the output value or constant value for display and use in the second field.

24. The method of claim 23, wherein the step of allowing the user to input the constant value comprises allowing the user to set a default constant value for the second field.

25. The method of claim 24, wherein the predetermined criteria comprises selecting the default constant value when a value is not available in one of the one or more first fields.

26. The method of claim 23, wherein the predetermined criteria comprises selecting the constant value when the constant value is input by the user after values become available in the one or more first fields and selecting the output value when the values become available in the one or more first fields after the constant value is input by the user.

27. The method of claim 23, comprising storing the constant value input by the user in the second field when the output value is displayed in the second field, and retrieving the constant value for display in the second field when values become unavailable in the one or more first fields.

28. For use in connection with a spreadsheet application program having a plurality of fields capable of storing a plurality of values, a method comprising:

allowing a first user having a first user identifier to input a plurality of formulas for receiving input values from one or more first fields in the spreadsheet and producing output values in one or more second fields in the spreadsheet;

wherein the plurality of formulas include a set of formulas that are computational inversions such that the one or more first fields and the one or more second fields are computationally consistent values;

storing the formulas in association with the first user identifier;

allowing a second user to input values in the one or more first fields to thereby invoke the formulas to produce output values; and preventing the second user from modifying the formulas.

29. The method of claim 28, comprising allowing the second user to input second formulas for receiving input values from one or more first fields in the spreadsheet and producing output values in one or more second fields in the spreadsheet.

30. The method of claim 28, further comprising allowing the first user to input a default value for a third field in the spreadsheet to be displayed in the third field in the absence of any other value for the third field, and preventing the second user from modifying the default value.

31. The data processing system of claim 1, wherein the conflict resolver includes means for suppressing one of the first output value and the second output value based on a predefined priority between the first calculator and the second calculator.

32. The data processing system of claim 1, wherein the conflict resolver includes means for suppressing one of the first output value and the second output value based a dependency of one of the first calculator and the second calculator on input values from other fields.

33. The data processing system of claim 1, wherein the conflict resolver includes means for suppressing one of the first output value and the second output value based a source of the input values to the first calculator and the second calculator.

34. The data processing system of claim 1, wherein the conflict resolver includes means for suppressing one of the first output value and the second output value based and a sequence wherein the oldest entered input value and its corresponding calculator are suppressed.

35. The method of claim 16, wherein the input values in the one or more first fields and one or more third fields become available at different times, and wherein the step of selecting comprises selecting the formula based on the time at which the input values become available.

36. The method of claim 35, wherein the step of selecting comprises selecting the first formula when the one or more first fields have values which become available later than the values in the one or more third fields.

37. The method of claim 19, comprising allowing a user to input a constant value into the second field, and using the third formula to produce an output value in one of the one or more third fields.

38. The method of claim 37, comprising allowing the user to delete the constant value from the second field, and, upon deletion of the constant value, selecting one of the first formula and second formula and using the selected formula to produce an output value for the second field.

* * * * *